(12) United States Patent
Shahar

(10) Patent No.: US 12,157,351 B2
(45) Date of Patent: Dec. 3, 2024

(54) ELECTRIC SPIRALING PISTON AND SYSTEMS DEVICES APPARATUSES AND METHODS UTILIZING SAME

(71) Applicant: Dawn Tech LTD, Tel-Aviv (IL)

(72) Inventor: Guy Shahar, Mevseret-Zion (IL)

(73) Assignee: DAWN TECH LTD, Tel-Aviv (IL)

( * ) Notice: Subject to any disclaimer, the term of this patent is extended or adjusted under 35 U.S.C. 154(b) by 122 days.

(21) Appl. No.: 17/802,976

(22) PCT Filed: Jul. 21, 2021

(86) PCT No.: PCT/IL2021/050889
§ 371 (c)(1),
(2) Date: Aug. 29, 2022

(87) PCT Pub. No.: WO2022/018732
PCT Pub. Date: Jan. 27, 2022

(65) Prior Publication Data
US 2023/0136980 A1    May 4, 2023

Related U.S. Application Data

(60) Provisional application No. 63/054,508, filed on Jul. 21, 2020.

(51) Int. Cl.
*B60J 1/20*    (2006.01)
*F16H 21/16*    (2006.01)

(52) U.S. Cl.
CPC ........... *B60J 1/2022* (2013.01); *B60J 1/2016* (2013.01); *B60J 1/2063* (2013.01); *F16H 21/16* (2013.01)

(58) Field of Classification Search
CPC ...... B60J 1/2027; B60J 1/2072; B60J 1/2047; B60J 1/2022; B60J 1/2077; B60J 1/2086; B60J 1/2063; E04C 3/005; E06B 9/68; E06B 2009/6845; B64G 1/222; F16H 19/064

See application file for complete search history.

(56) References Cited

U.S. PATENT DOCUMENTS

| | | | | |
|---|---|---|---|---|
| 2,874,770 | A * | 2/1959 | Rohr | B60J 1/2019 160/133 |
| 5,076,633 | A * | 12/1991 | Hsu | B60J 3/0204 160/310 |
| 5,718,087 | A * | 2/1998 | Featherstone | E04H 12/182 52/118 |
| 6,910,518 | B2 * | 6/2005 | Zimmermann | B60J 1/2069 160/370.21 |

(Continued)

*Primary Examiner* — Abe Massad

(57) ABSTRACT

Disclosed are an electric spiraling piston and systems, devices, apparatuses, and methods utilizing same. An electric spiraling piston includes a drum around which the piston spirals as it is being retracted. A spinning axis of the drum is functionally connected to the drive shaft of a motor, such that motor torque is relayed to the axis. The axis, when spinning with the drum in a first direction, causes the piston to un-spiral and extend out of a housing—while rounding its cross section—to assume a straight, rigid position/orientation. The Axis, when spinning with the drum in a second direction, causes the piston to be retracted back into the housing—while flattening its cross section—to assume a spiral orientation within the housing.

7 Claims, 26 Drawing Sheets

(56) References Cited

U.S. PATENT DOCUMENTS

| | | | | |
|---|---|---|---|---|
| 7,389,806 B2* | 6/2008 | Kates | ........................ | E06B 9/68 |
| | | | | 160/310 |
| 7,891,145 B1* | 2/2011 | Bobbio | ................ | E04H 12/185 |
| | | | | 242/379.2 |
| 8,066,227 B2* | 11/2011 | Keller | .................... | H02S 10/40 |
| | | | | 244/172.6 |
| 8,752,880 B1* | 6/2014 | Morazan | ................. | B60J 11/00 |
| | | | | 296/97.1 |
| 8,939,189 B2* | 1/2015 | Ojima | .................... | B60J 1/2083 |
| | | | | 160/370.22 |
| 9,669,949 B2* | 6/2017 | Baudasse | ............... | B64G 1/222 |
| 10,119,330 B2* | 11/2018 | Brunk | ....................... | E06B 9/44 |
| 10,486,503 B2* | 11/2019 | Freese | ................... | B60J 1/2086 |
| 10,625,588 B2* | 4/2020 | Gurley | ..................... | B60J 11/04 |
| 11,292,616 B2* | 4/2022 | Hensley | ................. | B64G 1/222 |
| 11,524,560 B1* | 12/2022 | Romein | ................. | B60J 7/1291 |
| 2008/0216973 A1* | 9/2008 | Walter | ................... | B60J 1/2086 |
| | | | | 160/313 |
| 2012/0061036 A1* | 3/2012 | Agbozouhoue | ........ | B60J 1/2038 |
| | | | | 160/309 |
| 2014/0150863 A1* | 6/2014 | Spence | ................. | B64G 1/222 |
| | | | | 428/36.1 |
| 2014/0151485 A1* | 6/2014 | Baudasse | ............... | B65H 75/34 |
| | | | | 242/375 |
| 2018/0111703 A1* | 4/2018 | Hensley | ................. | B64G 1/222 |
| 2019/0277087 A1* | 9/2019 | Pereira | ...................... | E06B 9/72 |
| 2020/0149857 A1* | 5/2020 | Mayer | ................... | G01B 5/004 |
| 2020/0199934 A1* | 6/2020 | Colson | ...................... | E06B 9/68 |

* cited by examiner

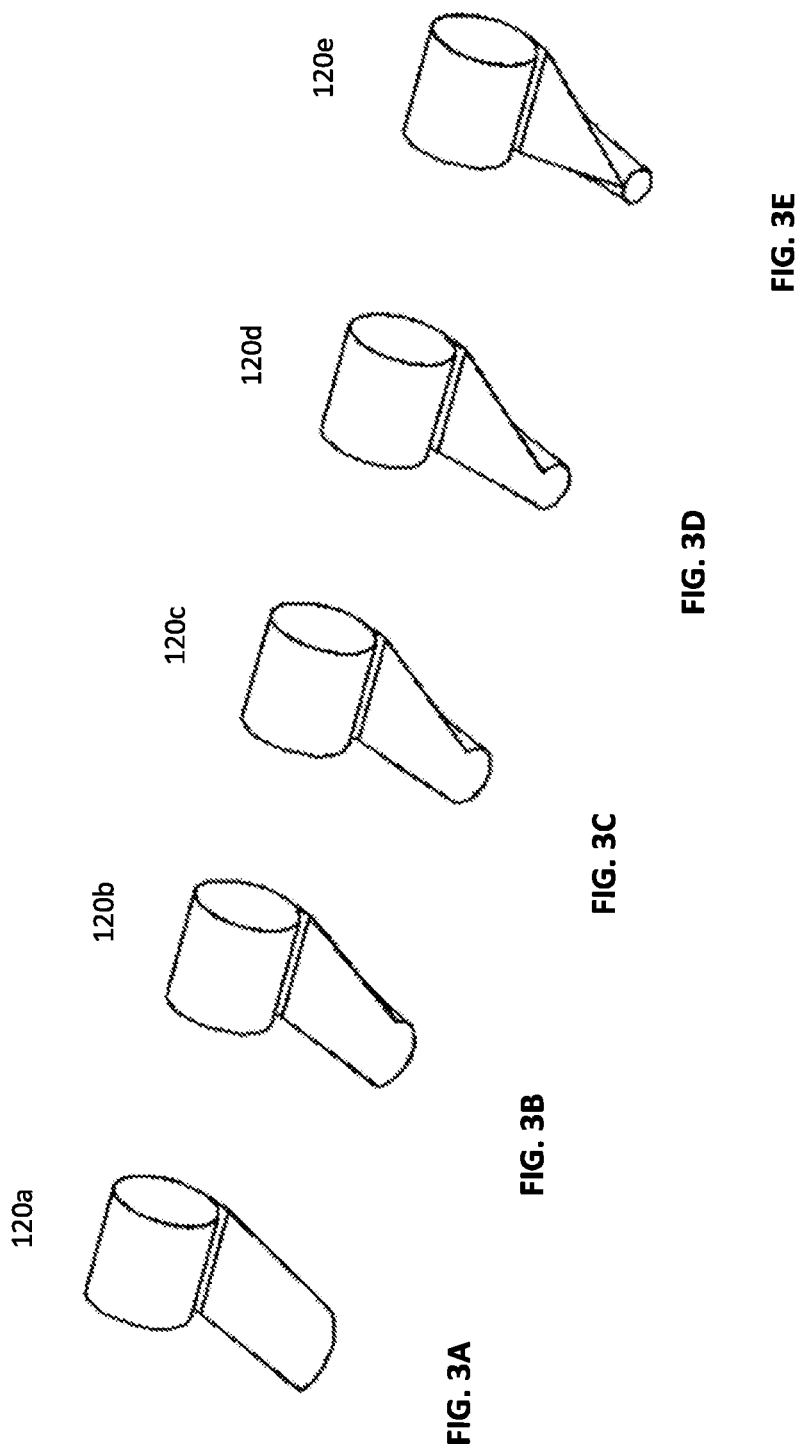

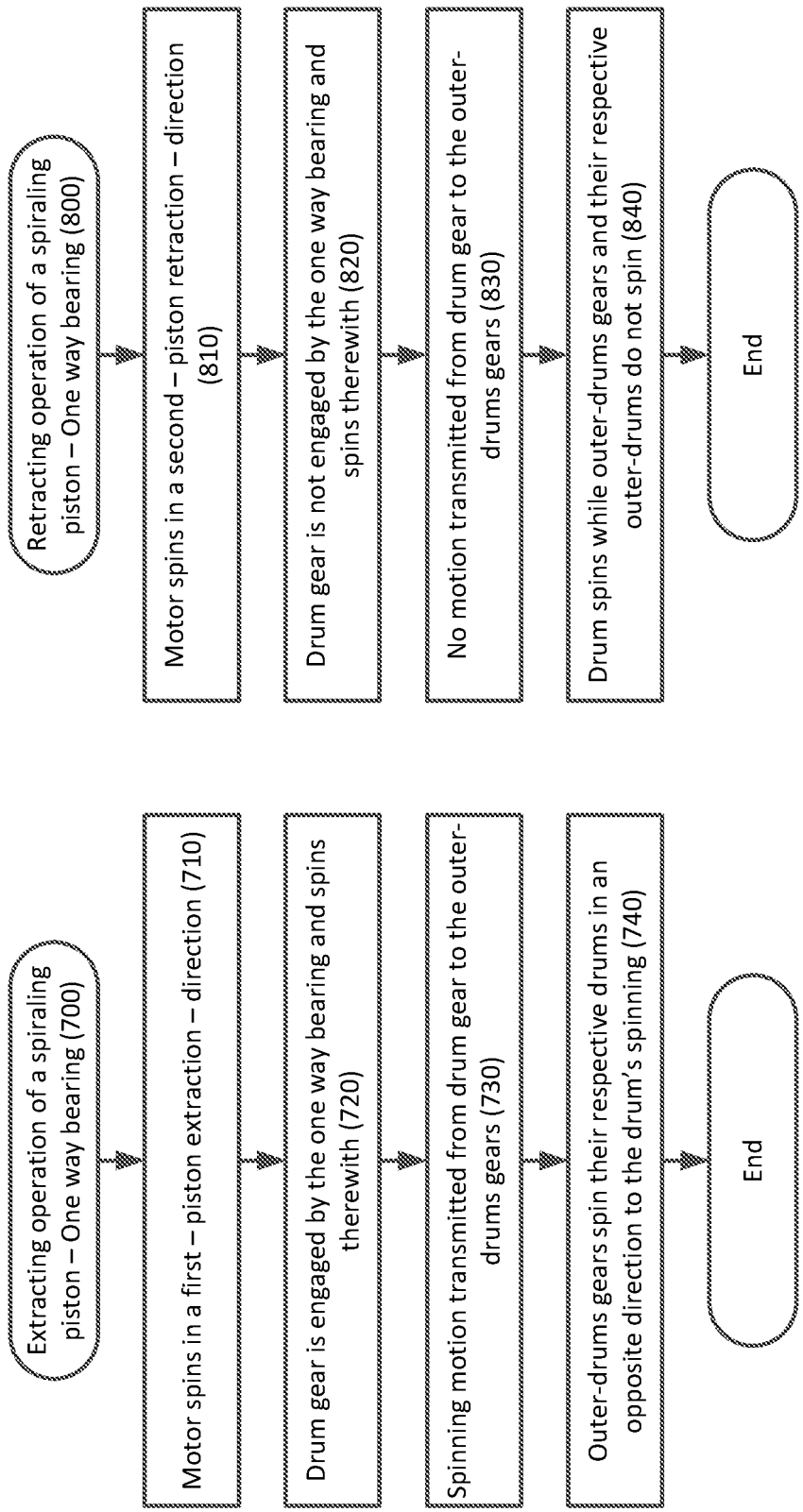

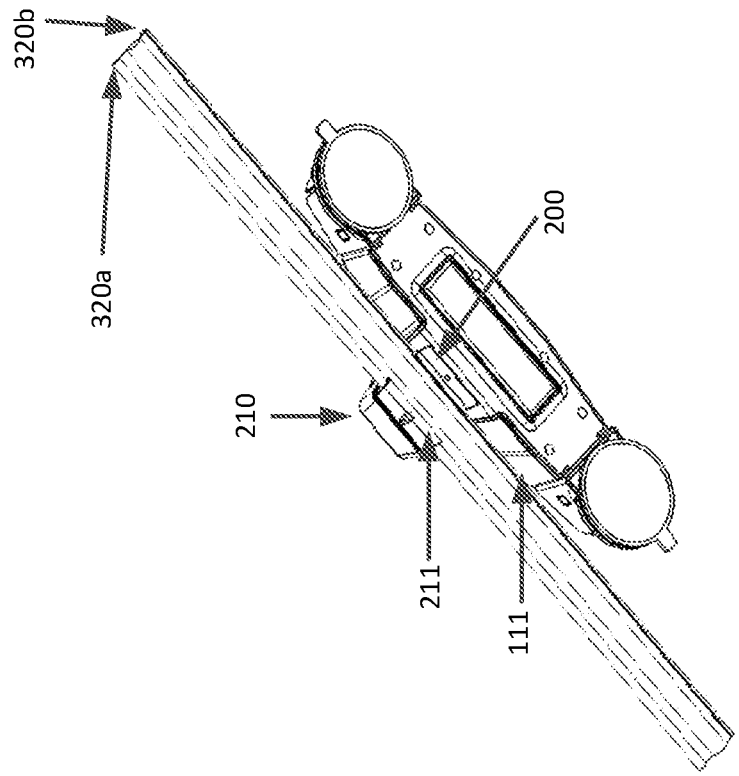
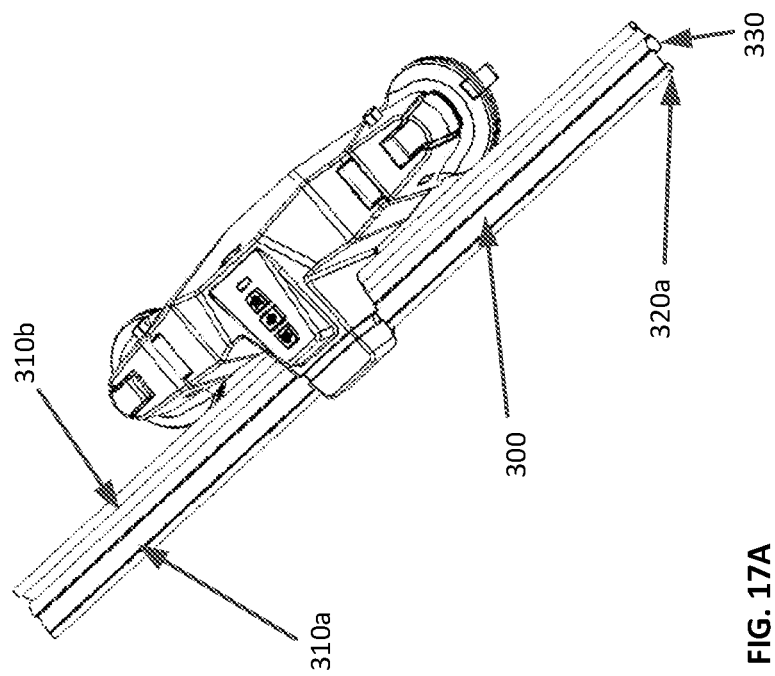
FIG. 17B
FIG. 17A

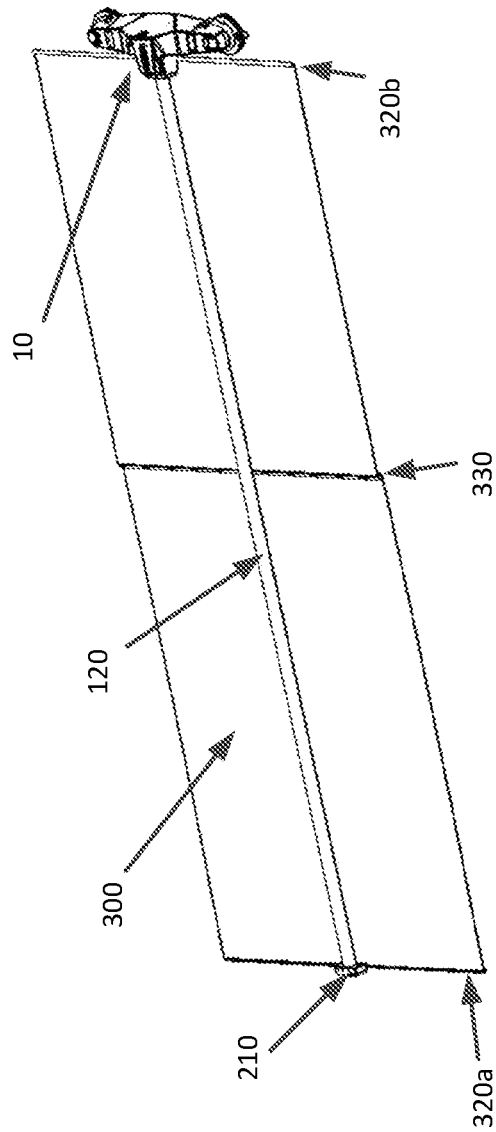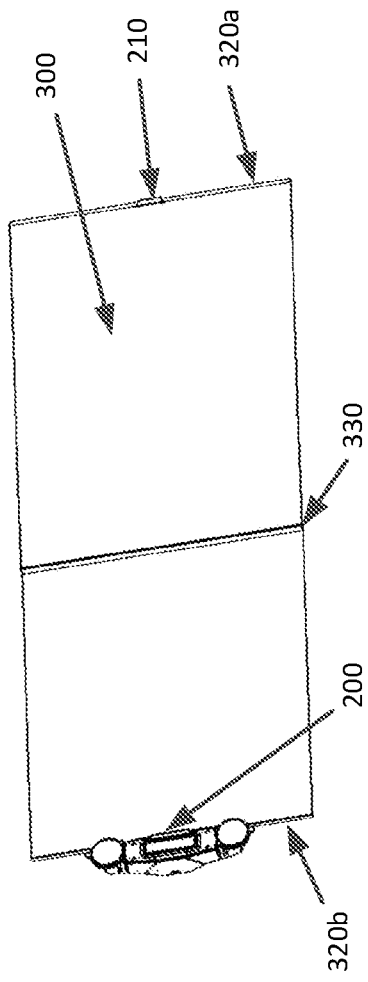
FIG. 18A
FIG. 18B

ELECTRIC SPIRALING PISTON AND SYSTEMS DEVICES APPARATUSES AND METHODS UTILIZING SAME

RELATED APPLICATIONS SECTION

The present application is a national phase application of international PCT application number PCT/IL2021/050889, filed Jul. 21, 2021. The PCT/IL2021/050889 application claims priority from U.S. Provisional Patent Application No. 63/054,508, filed Jul. 21, 2020. All listed related applications are hereby incorporated by reference in their entirety.

FIELD OF THE INVENTION

The present invention generally relates to the field of mechanical components and their application. More specifically, the present invention relates to an electric spiraling piston and systems, devices, apparatuses and methods utilizing same.

BACKGROUND

Common pistons take the form of a moving component such as a rod or a shaft that is contained by, and moves within and along, a cylindrical frame. Accordingly, the minimal—retracted—length of pistons and other extendable rods or shafts, is nowadays limited to the length of the cylinder, frame, or track, within which they operate.

There remains a need, in the field of mechanical components and their application, for electrically spiraling pistons, extractable to a straight orientation and circularly retractable into a housing to provide a high 'extended piston length' to 'retracted piston length' ratio—and for various solutions and applications, utilizing or implementing a piston of such structure or type.

SUMMARY OF THE INVENTION

Embodiments of the present invention include an electric spiraling piston and systems, devices, apparatuses and methods utilizing same.

There may be provided, in accordance with some embodiments, an electric spiraling piston structured to provide rigidness across its length when in an extended, straight position, while circularly spiraling into a housing when being retracted.

An electric spiraling piston, according to embodiments, may include an axis around which the piston spirals as it is being retracted. The axis may be functionally connected to the drive shaft of an electric motor, such that motor torque is relayed to the axis. The axis, when spinning in a first direction, causes the piston to un-spiral and extend out of the housing to its straight, rigid position/orientation; and when spinning in a second direction, causes the piston to be retracted back to its spiral position/orientation within the housing.

A spiraling piston, according to embodiments, may be shaped in the form of an elongated sheet/strip of material, biased to round its cross-section shape from a flat shape and into the shape of: part of a circle, a full circle, or more than a circle (i.e. a circle and an extra overlap—forming part of, or an entire, additional circle).

An electric spiraling piston housing, according to embodiments, may include a piston entry slot. The piston entry slot may have a substantially flat narrow opening such that an extended piston biased into its circular cross section shape, when being retracted into the housing, is flattened by the narrow opening against its bias to a substantially flat cross section shape. The cross-section flattened part of the piston, when further retracted, winds around the axis to form a spiral shape.

When the piston is extended through the entry slot and out of the housing, the bias causes its exiting section to round back to a part-circle, full-circle, more-than-circle, or multi-circle cross section shape—yielding the extended pistons' straight rigidness.

According to some embodiments, an electric spiraling piston housing may include a piston entry/exit support component, in the form of a one or more tubes, tracks, wheels, blades and/or shafts. The support component may be connected to the housing at, around, or in proximity to, the piston entry slot; and may run for a short distance in parallel to the piston section exiting the housing, thereby providing this piston section with support and straight rigidness, as bias may have not caused it to round to its fully biased cross section shape.

An electric spiraling piston, in accordance with embodiments, may for example be utilized for the opening and closing of a sheet, a curtain and/or a shade, such as: a projection screen, a car sunshade, a home curtain, a sailboat's sail and/or other. The tip of the piston may be connected to an opening side/tip/edge of the sheet wherein an opposite, retained, side/tip/edge of the sheet is connected to the piston housing. Extending of the piston unrolls the sheet to open/spread, while retracting of the piston rolls the sheet to close/fold.

An electric spiraling piston, in accordance with embodiments, may for example be utilized for the opening, closing and/or retention of hinge/pivot connected elements, such as doors and windows, for example: a kitchen cabinet door or a car's trunk door, retained at an open position using the extended spiraling piston.

An electric spiraling piston, in accordance with embodiments, may for example be utilized for the mobilization of and/or interaction with a physical element or item, wherein extending and retracting of the piston mobilizes (e.g. pushes, pulls) or engages (e.g. presses, pushes, switches) the element/item.

An electric spiraling piston, in accordance with embodiments, may be utilized for various other known uses of a piston or an extendable shaft, for example, as part of the operation of mechanical equipment, engines, actuators, antennas and/or other.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings:

In FIG. 3A, there is shown an exemplary electric spiraling piston in a partially extended position, wherein the piston is biased to round its cross-section shape from a flat shape and into the shape of a small part of a circle, as it exits the housing, in accordance with some embodiments of the present invention;

In FIG. 3B, there is shown an exemplary electric spiraling piston in a partially extended position, wherein the piston is biased to round its cross section shape from a flat shape and into the shape of a larger part of a circle (than FIG. 3A), as it exits the housing, in accordance with some embodiments of the present invention;

In FIG. 3C, there is shown an exemplary electric spiraling piston in a partially extended position, wherein the piston is biased to round its cross-section shape from a flat shape and into the shape of a larger part of a circle (than FIG. 3B), as it exits the housing, in accordance with some embodiments of the present invention;

In FIG. 3D, there is shown an exemplary electric spiraling piston in a partially extended position, wherein the piston is biased to round its cross section shape from a flat shape and into the shape of a larger part of a circle (than FIG. 3C), as it exits the housing, in accordance with some embodiments of the present invention;

In FIG. 3E, there is shown an exemplary electric spiraling piston in a partially extended position, wherein the piston is biased to round its cross section shape from a flat shape and into the shape of a full circle, or more than a full circle, as it exits the housing, in accordance with some embodiments of the present invention;

In FIG. 14A, there is shown a flowchart of the main steps executed as part of an exemplary extracting operation of an electric spiraling piston using a one way bearing, in accordance with some embodiments of the present invention;

In FIG. 14B, there is shown a flowchart of the main steps executed as part of an exemplary retracting operation of an electric spiraling piston using a one way bearing, in accordance with some embodiments of the present invention;

In FIG. 17A there is shown a top perspective of an exemplary motorized car curtain, shown in a retracted curtain position and including an electric spiraling piston unit as described herein and a rollable curtain, in accordance with some embodiments;

In FIG. 17B there is shown a bottom perspective of an exemplary motorized car curtain, shown in a retracted curtain position and including an electric spiraling piston unit as described herein and a rollable curtain, in accordance with some embodiments;

In FIG. 18A there is shown a top perspective of an exemplary motorized car curtain, shown in an extracted curtain position and including an electric spiraling piston unit as described herein and a rollable curtain, in accordance with some embodiments;

In FIG. 18B there is shown a bottom perspective of an exemplary motorized car curtain, shown in an extracted curtain position and including an electric spiraling piston unit as described herein and a rollable curtain, in accordance with some embodiments;

Figure 1A:
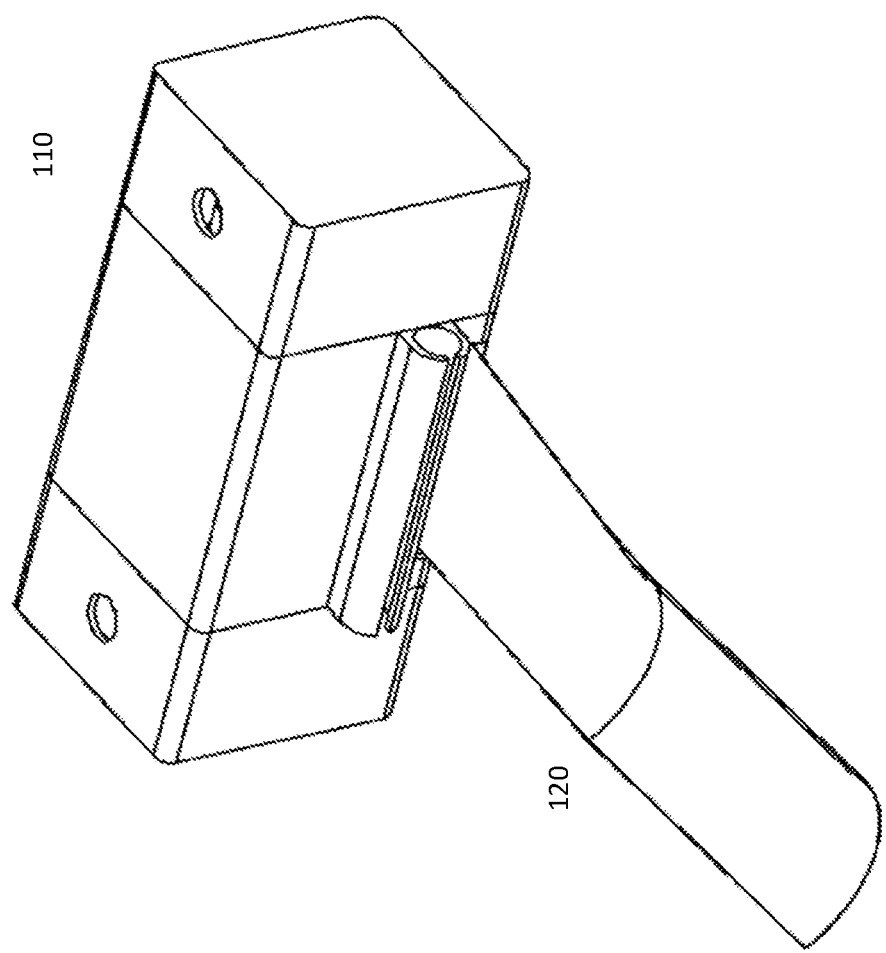
In FIG. 1A, there is shown an exemplary electric spiraling piston in a partially extended position, in accordance with some embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals or element labeling may be repeated among the figures to indicate corresponding or analogous elements.

DETAILED DESCRIPTION

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Functions, operations, components and/or features described herein with reference to one or more embodiments, may be combined with, or may be utilized in combination with, one or more other functions, operations, components and/or features described herein with reference to one or more other embodiments.

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "includes", "including", "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

The present disclosure is to be considered as an exemplification of the invention, and is not intended to limit the invention to the specific embodiments illustrated by the figures or description below.

Embodiments of the present invention include an electric spiraling piston and systems, devices, apparatuses and methods utilizing same.

There may be provided, in accordance with some embodiments, an electric spiraling piston structured to provide rigidness across its length when in an extended, straight position, while circularly spiraling into a housing when being retracted.

An electric spiraling piston, according to embodiments, may include an axis around which the piston spirals as it is being retracted. The axis may be functionally connected to the drive shaft of an electric motor, such that motor torque is relayed to the axis. The axis, when spinning in a first direction, causes the piston to un-spiral and extend out of the housing to its straight, rigid position/orientation; and when spinning in a second direction, causes the piston to be retracted back to its spiral position/orientation within the housing.

A spiraling piston, according to embodiments, may be shaped in the form of an elongated sheet/strip of material, biased to round its cross-section shape from a flat shape and into the shape of: part of a circle, a full circle, or more than a circle (i.e. a circle and an extra overlap—forming part of, or an entire, additional circle).

An electric spiraling piston housing, according to embodiments, may include a piston entry slot. The piston entry slot may have a substantially flat narrow opening such that an extended piston biased into its circular cross section shape, when being retracted into the housing, is flattened by the narrow opening against its bias to a substantially flat cross section shape. The cross-section flattened part of the piston, when further retracted, winds around the axis to form a spiral shape.

When the piston is extended through the entry slot and out of the housing, the bias causes its exiting section to round back to a part-circle, full-circle, more-than-circle, or multi-circle cross section shape—yielding the extended pistons' straight rigidness.

According to some embodiments, an electric spiraling piston housing may include a piston entry/exit support component, in the form of a one or more tubes, tracks, wheels, blades and/or shafts. The support component may be connected to the housing at, around, or in proximity to, the piston entry slot; and may run for a short distance in parallel to the piston section exiting the housing, thereby providing this piston section with support and straight rigidness, as bias may have not caused it to round to its fully biased cross section shape.

An electric spiraling piston, in accordance with embodiments, may for example be utilized for the opening and closing of a sheet, a curtain and/or a shade, such as: a projection screen, a car sunshade, a home curtain, a sailboat's sail and/or other. The tip of the piston may be connected to an opening side/tip/edge of the sheet wherein an opposite, retained, side/tip/edge of the sheet is connected to the piston housing. Extending of the piston unrolls the sheet to open/spread, while retracting of the piston rolls the sheet to close/fold.

An electric spiraling piston, in accordance with embodiments, may for example be utilized for the opening, closing and/or retention of hinge/pivot connected elements, such as doors and windows, for example: a kitchen cabinet door or a car's trunk door, retained at an open position using the extended spiraling piston.

An electric spiraling piston, in accordance with embodiments, may for example be utilized for the mobilization of and/or interaction with a physical element or item, wherein extending and retracting of the piston mobilizes (e.g. pushes, pulls) or engages (e.g. presses, pushes, switches) the element/item.

An electric spiraling piston, in accordance with embodiments, may be utilized for various other known uses of a piston or an extendable shaft, for example, as part of the operation of mechanical equipment, engines, actuators, antennas and/or other.

A spiraling piston unit, according to some embodiments of the present invention, may comprise a combination of at least the following components: (1) An elongated strip having a cross section biased to round; (2) A strip housing; (3) An electric motor, having its drive shaft aligned with and connected to a strip housing center-shaft/axis—for spinning the axis in one direction to roll-out/un-spiral and extend the elongated strip and for spinning the axis in the opposite direction to roll-in/spiral and retract the elongated strip; (4) An electric power source for powering the motor; and/or (5) a controller for triggering the operation and spinning of the motor in one of the two possible directions, based on a received command or signal.

According to some embodiments, the electric motor torque may be relayed to the axis through a mechanical transmission component, implementing a gearwheel(s) based, and/or a strap(s)/chain(s) based, transmission solution.

A motorized curtain, according to some embodiments of the present invention, may comprise a combination of at least the following components:

(1) A curtain comprising: (a) a sheet; (b) one or more connection points or elements on a first side of the sheet; and/or (c) one or more connection points or elements on a second, opposite, side of the sheet.

(2) A spiraling piston unit as described above, further comprising: (a) one or more curtain connectors for (i) connecting to the connection elements on the first side of the sheet and (ii) retaining the first side of the sheet to the body of the spiraling piston unit; (b) one or more curtain connectors for (i) connecting to the connection elements on the second side of the sheet and (ii) retaining the second side of the sheet to the tip of the elongated strip of the spiraling piston; (c) one or more attachment components for attaching the body of the spiraling piston unit to, or near, a side/edge of a window, such that upon operation of the motor and extension of the elongated strip, the first side of the sheet remains stationary and connected to the unit's body and the second side of the sheet travels, along with and with support of the elongated strip, towards and to the opposite side of the window—thereby closing the curtain.

A motorized curtain for a vehicle, according to some embodiments of the present invention, may comprise a combination of at least the following components:

(1) A vehicle window curtain comprising: (a) a rectangular sheet; (a) a first pole connected to a first short edge of the rectangular shading sheet; and/or (c) a second pole connected to a second, opposite, short edge of the rectangular shading sheet.

(2) A spiraling piston unit as described above, further comprising: (a) a first curtain connector for retaining the first window curtain pole to the body of the spiraling piston unit; (b) a second curtain connector for retaining the second window curtain pole to the tip of the elongated strip of the spiraling piston; (c) a window attachment component for attaching, optionally at a single connection point, the body of the spiraling piston unit to one side of an inner surface of a vehicle window, such that upon operation of the motor and extension of the elongated strip, the first pole of the curtain remains stationary and connected to the unit's body and the second pole of the curtain travels, along with and with support of the elongated strip, towards and to the opposite side of the inner surface of the vehicle window—thereby closing the curtain.

A motorized curtain, in accordance with embodiments, may be a rolling curtain comprising a rolling sheet type, wherein the elongated strip runs and thereby supports the sheet from the side, top and/or bottom.

A motorized curtain, in accordance with embodiments, may be an accordion curtain comprising a zigzagging sheet type, wherein the elongated strip is intervened into the sheet and thereby supports it from within.

The controller of a spiraling piston unit, or a motorized curtain utilizing same, in accordance with embodiments, may trigger the operation and spinning of the motor in one of the two possible directions, based on a command or signal received from/over any combination of the following operational interfaces and/or signal/data networks: (1) A unit control panel command; (2) A remote control (e.g. RF) command; (3) Triggered by a vehicle/machine/home locking-unlocking/ignition-start-stop remote control or smart key command; (4) Triggered by vehicle/machine/home locking-unlocking/ignition-start-stop direct command (e.g. curtain opening is key-start triggered); (5) Command received wirelessly (e.g. Bluetooth, Wi-Fi, NFC, Cellular) over a data/signal network; (6) A mobile device client application command, where the mobile device application may also receive and present operation/maintenance status updates; (7) An Internet of Things (IoT) platform interface command; (8) Triggered by in-vehicle/smart-home sensor(s) (e.g. thermostat, microphone, camera) readout(s) over/under/passing a threshold value(s); (9) A user voice command; and/or (10) From any other machine interface and/or over any other network or medium.

A motorized curtain for a vehicle, in accordance with embodiments, may include solar panels on the body of the spiraling piston unit, on the side facing the inner window surface, to convert sunlight into electric power for powering the unit and/or charging its electric power source.

The window attachment component of a motorized curtain for a vehicle, in accordance with embodiments, may be/include: (1) A vacuum-based mechanism; (2) A decal/glue/adhesive based mechanism; (3) A screw/bolt/pin based mechanism; and/or (4) any other mechanism, solution, or means for connecting to a window, a window frame and/or a location in the proximity of a window.

A motorized curtain for a vehicle, in accordance with embodiments, may include a road camera connected to the body of the spiraling piston unit, oriented such that the lens of the camera faces the inner window surface and at a position between the curtain and the window—enabling it to acquire images of the outside of the vehicle.

According to some embodiments, the operation of road camera may be triggered by the closing or opening of the curtain or by the receipt of a curtain operation command. According to further embodiments, the road camera's operation, and/or of other peripherals' operation, may be correlated-to/triggered-by vehicle locking/unlocking/starting/halting/GPS-movement/location and/or other factors.

In FIG. 1A, there is shown an exemplary electric spiraling piston in a partially extended position, in accordance with some embodiments of the present invention. In the figure, the piston (120) and the piston housing (110) are shown.

Figure 1C:
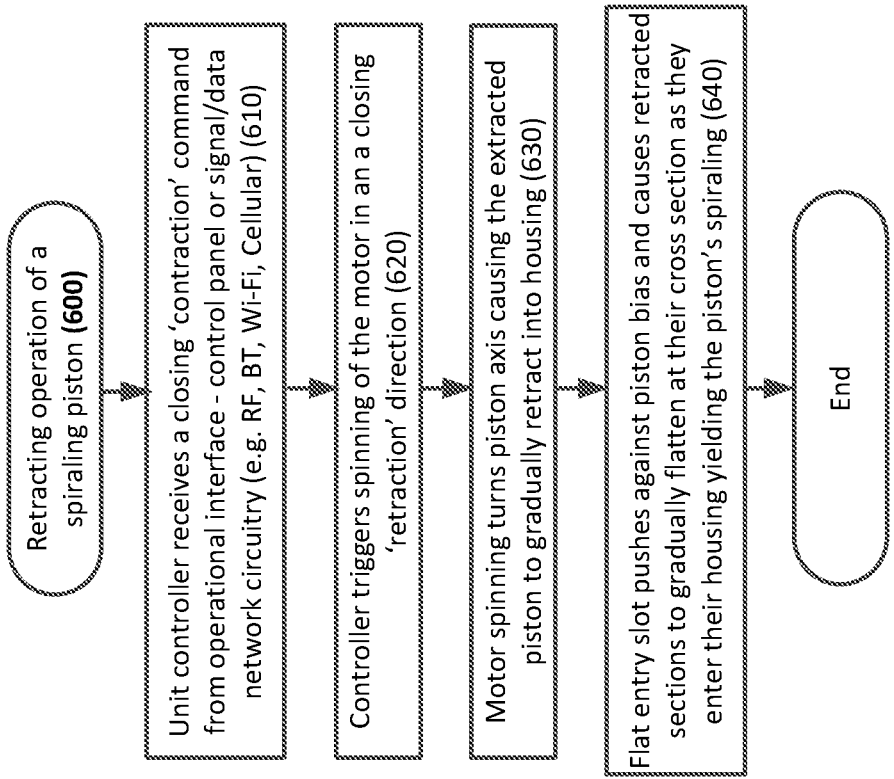
In FIG. 1C, there is shown a flowchart of the main steps executed as part of an exemplary retracting operation of an electric spiraling piston, in accordance with some embodiments of the present invention.
Figure 1B:
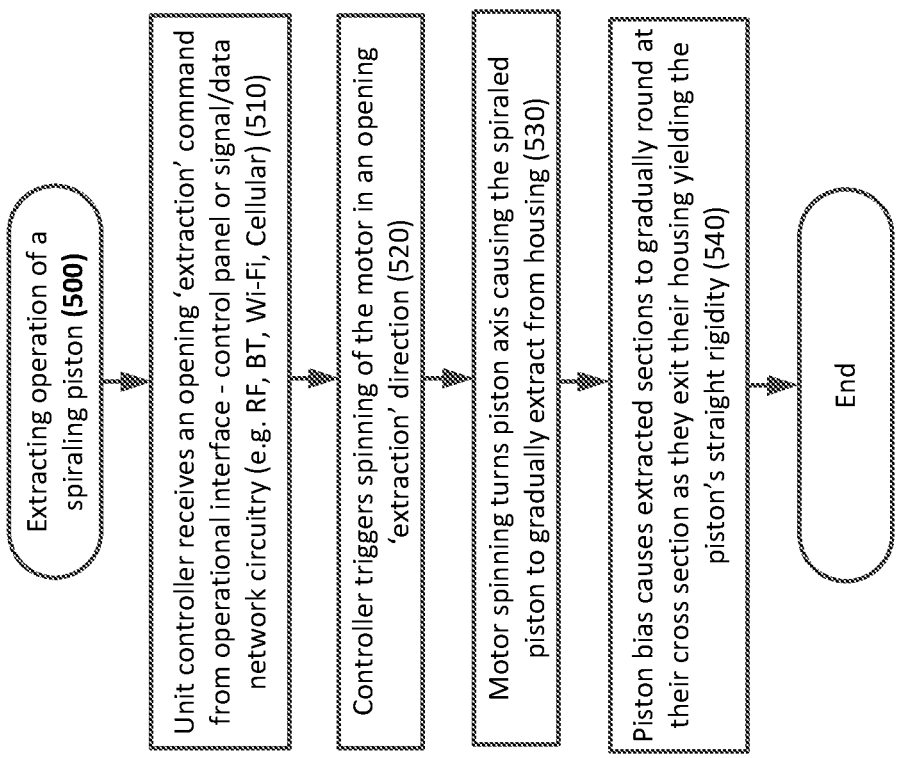
In FIG. 1B, there is shown a flowchart of the main steps executed as part of an exemplary extending operation of an electric spiraling piston, in accordance with some embodiments of the present invention.

In FIG. 1B, there is shown a flowchart of the main steps executed as part of an exemplary extracting/extending operation of an electric spiraling piston (500), in accordance with some embodiments of the present invention. Shown steps include: (1) Unit controller receives an opening 'extraction' command from operational interface—control panel or signal/data network circuitry (e.g. RF, BT, Wi-Fi, Cellular) (510); (2) Controller triggers spinning of the motor in an opening 'extraction' direction (520); (3) Motor spinning turns piston axis causing the spiraled piston to gradually extract from housing (530); and (4) Piston bias causes extracted sections to gradually round at their cross section as they exit their housing yielding the piston's straight rigidity (540).

In FIG. 1C, there is shown a flowchart of the main steps executed as part of an exemplary retracting operation of an electric spiraling piston (600), in accordance with some embodiments of the present invention. Shown steps include: (1) Unit controller receives a closing 'contraction' command from operational interface—control panel or signal/data network circuitry (e.g. RF, BT, Wi-Fi, Cellular) (601); (2) Controller triggers spinning of the motor in an a closing 'retraction' direction (602); (3) Motor spinning turns piston axis causing the extracted piston to gradually retract into housing (603); and (4) Flat entry slot pushes against piston bias and causes retracted sections to gradually flatten at their cross section as they enter their housing yielding the piston's spiraling (604).

Figure 2A:
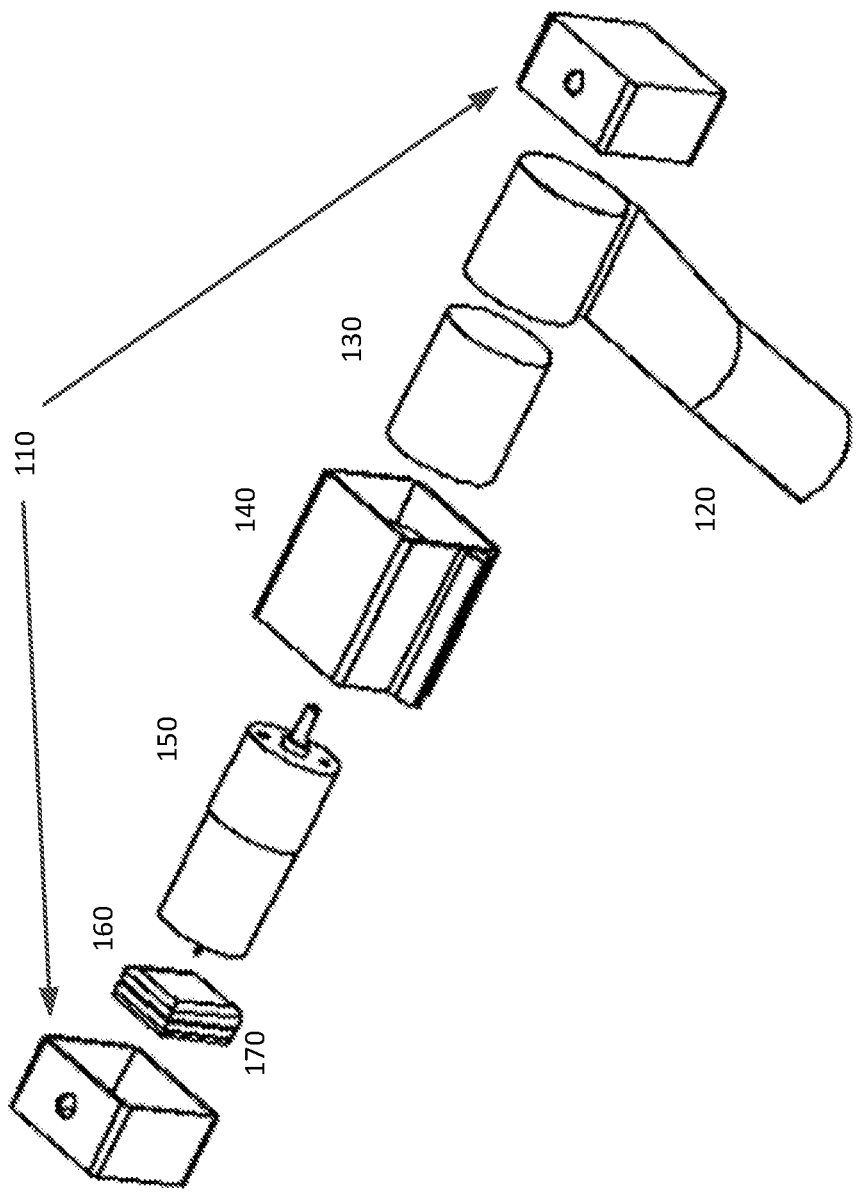
In FIG. 2A, there is shown an exploded view, in a first perspective, of an exemplary electric spiraling piston in a partially extended position, including elements and components thereof, in accordance with some embodiments of the present invention.

In FIG. 2A, there is shown an exploded view, in a first perspective, of an exemplary electric spiraling piston in a partially extended position, including elements and components thereof, in accordance with some embodiments of the present invention. In the figure there are shown: a piston unit housing/body (110), an electric power source (170) and a controller (160), an electric motor (150), a piston strip housing (140), a piston spiral axis/drum (130) and an elongated strip forming the piston (120).

Figure 2B:
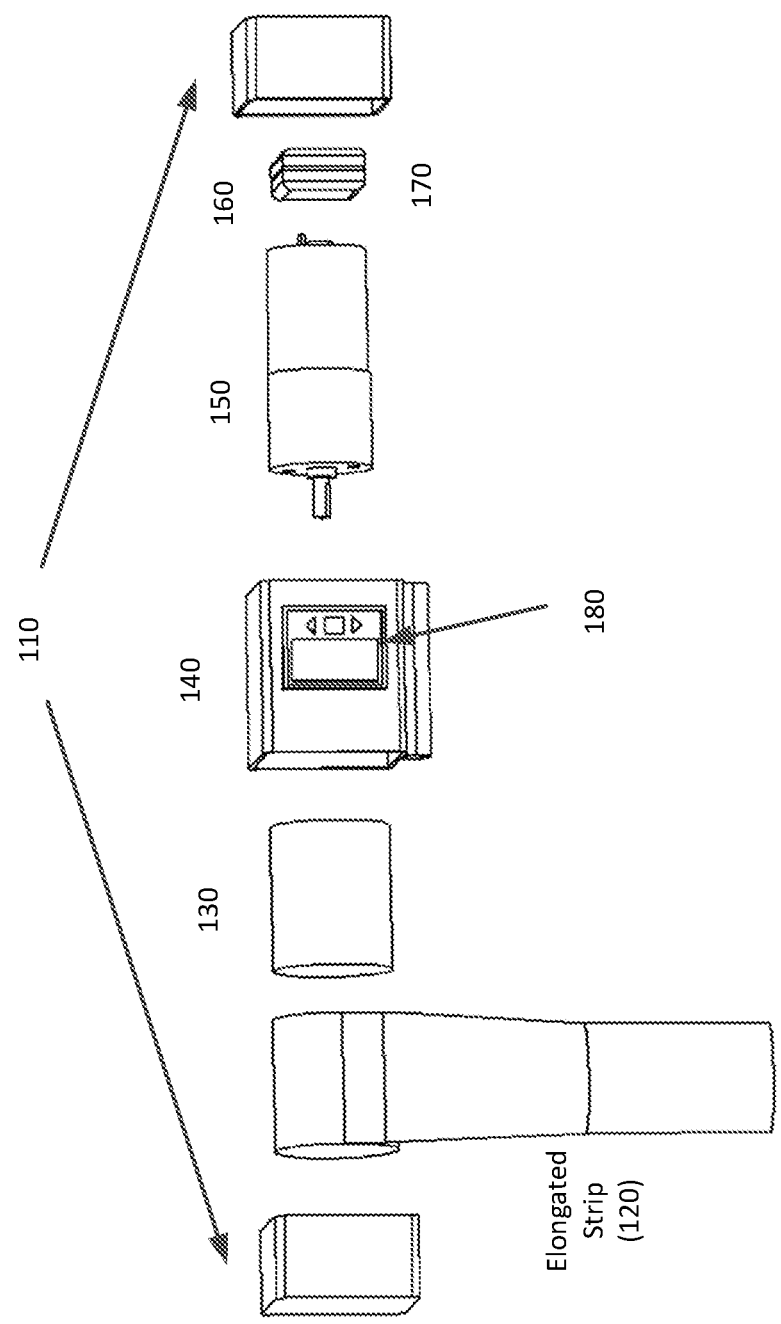
In FIG. 2B, there is shown an exploded view, in a second perspective, of an exemplary electric spiraling piston in a partially extended position, in accordance with some embodiments of the present invention.

In FIG. 2B, there is shown an exploded view, in a second perspective, of an exemplary electric spiraling piston in a partially extended position, in accordance with some embodiments of the present invention. In the figure there are shown: a piston unit housing/body (110), an electric power source (170) and a controller (160), an electric motor (150), a piston strip housing (140) and a user control panel (180) positioned on the housing, a piston spiral axis/drum (130) and an elongated strip forming the piston (120).

In FIG. 3A, there is shown an exemplary electric spiraling piston in a partially extended position, wherein the piston is biased to round its cross-section shape from a flat shape and into the shape of a small part of a circle (120a), as it exits the housing, in accordance with some embodiments of the present invention.

In FIG. 3B, there is shown an exemplary electric spiraling piston in a partially extended position, wherein the piston is biased to round its cross section shape from a flat shape and into the shape of a larger part of a circle (than FIG. 3A) (120b), as it exits the housing, in accordance with some embodiments of the present invention.

In FIG. 3C, there is shown an exemplary electric spiraling piston in a partially extended position, wherein the piston is biased to round its cross-section shape from a flat shape and into the shape of a larger part of a circle (than FIG. 3B) (120c), as it exits the housing, in accordance with some embodiments of the present invention.

In FIG. 3D, there is shown an exemplary electric spiraling piston in a partially extended position, wherein the piston is biased to round its cross section shape from a flat shape and into the shape of a larger part of a circle (than FIG. 3C) (120d), as it exits the housing, in accordance with some embodiments of the present invention.

In FIG. 3E, there is shown an exemplary electric spiraling piston in a partially extended position, wherein the piston is biased to round its cross-section shape from a flat shape and into the shape of a full circle, or more than a full circle (120e), as it exits the housing, in accordance with some embodiments of the present invention.

Figure 4B:
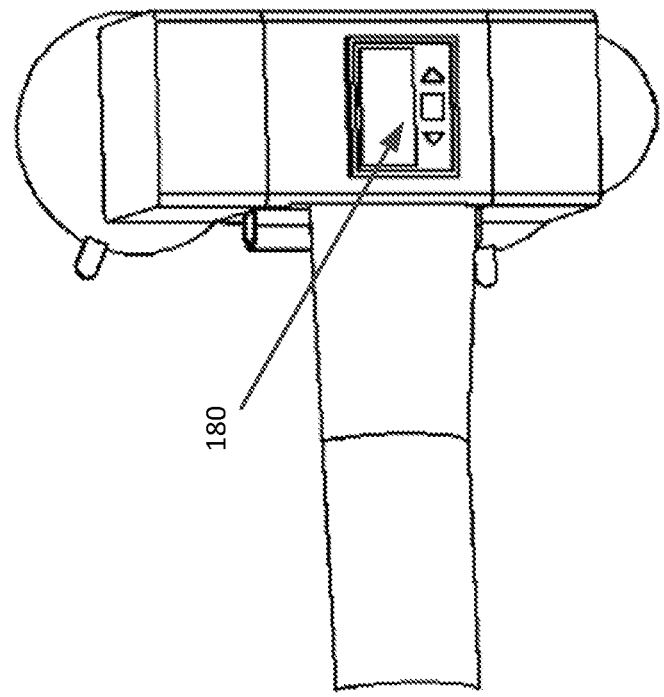
In FIG. 4B, there is shown an exemplary, electric spiraling piston utilizing, auto shade device, shown in a second perspective, in accordance with some embodiments of the present invention.
Figure 4A:
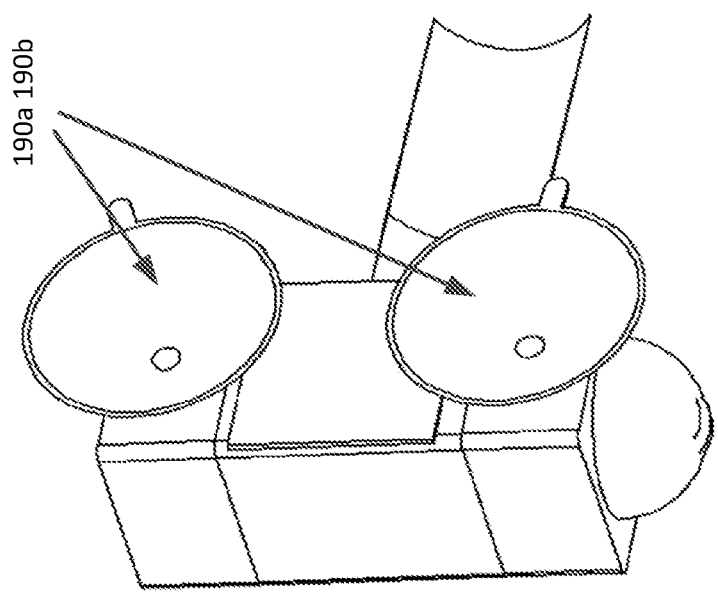
In FIG. 4A, there is shown an exemplary, electric spiraling piston utilizing, auto shade device, shown in a first perspective, in accordance with some embodiments of the present invention.

In FIG. 4A, there is shown an exemplary, electric spiraling piston utilizing, auto shade device, shown in a first perspective, in accordance with some embodiments of the present invention. In the figure, window connection plugs (190a, 190b) for connecting the auto shade device to the inside of a vehicle's window are clearly shown.

In FIG. 4B, there is shown an exemplary, electric spiraling piston utilizing, auto shade device, shown in a second perspective, in accordance with some embodiments of the present invention. In the figure, a user operational interface (control and display panel) (180) for controlling the opening and closing of the curtain of the auto shade device, is clearly shown.

Figure 5:
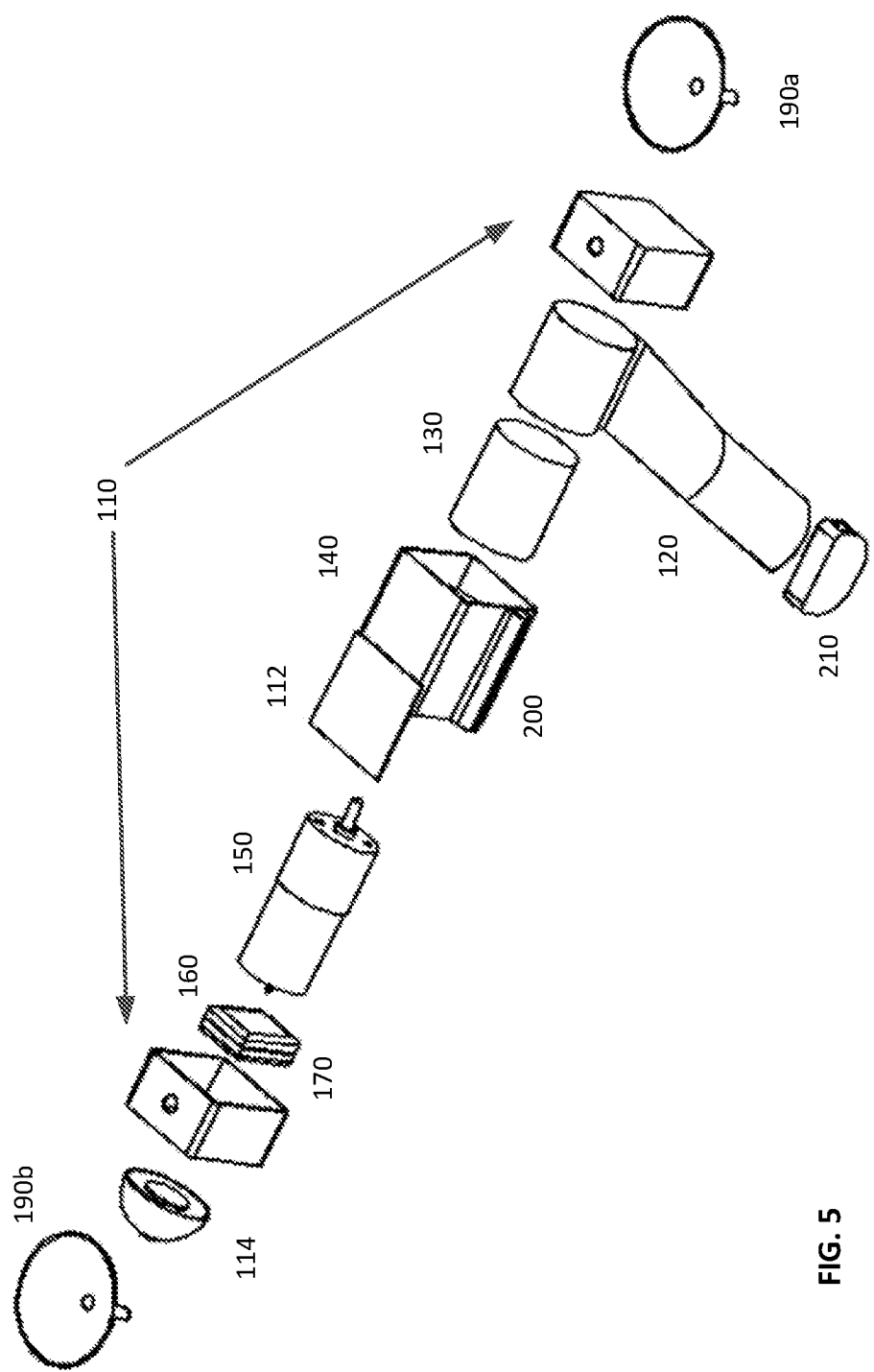
In FIG. 5, there is shown an exploded view, of an exemplary, electric spiraling piston utilizing, auto shade device, in a partially extended position, including elements and components thereof, in accordance with some embodiments of the present invention.

In FIG. 5, there is shown an exploded view, of an exemplary, electric spiraling piston utilizing, auto shade device, in a partially extended position, including elements and components thereof, in accordance with some embodiments of the present invention. In the figure there are shown: a piston unit housing/body (110), an electric power source (170) and a controller (160), an electric motor (150), a piston strip housing (140) having a solar panel (112) and a first curtain connector (200); a camera (114); a piston spiral axis/drum (130); an elongated strip forming the piston (120); a second curtain connector (210); and two window attachment components/plugs (190a, 190b).

Figure 6A:
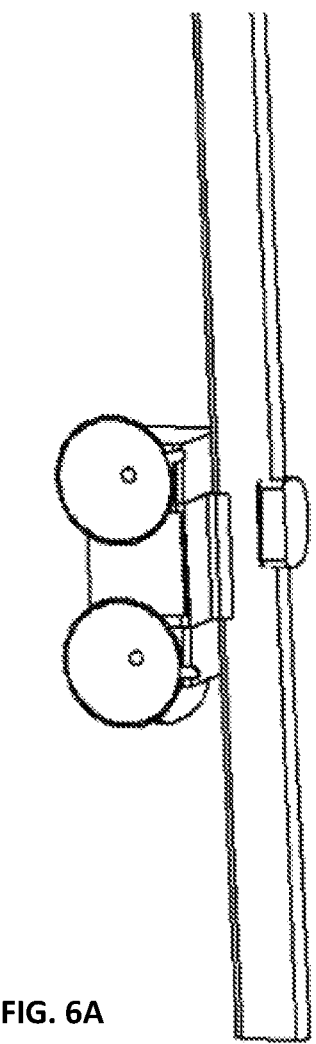
In FIG. 6A, there is shown an exemplary, electric spiraling piston utilizing, auto shade device, connected to an auto shade, shown in a first perspective, in accordance with some embodiments of the present invention.

In FIG. 6A, there is shown an exemplary, electric spiraling piston utilizing, auto shade device, connected to an auto shade, shown in a first perspective, in accordance with some embodiments of the present invention. The electric piston, and the auto shade connected thereto, are shown in a retracted/closed position.

Figure 6B:
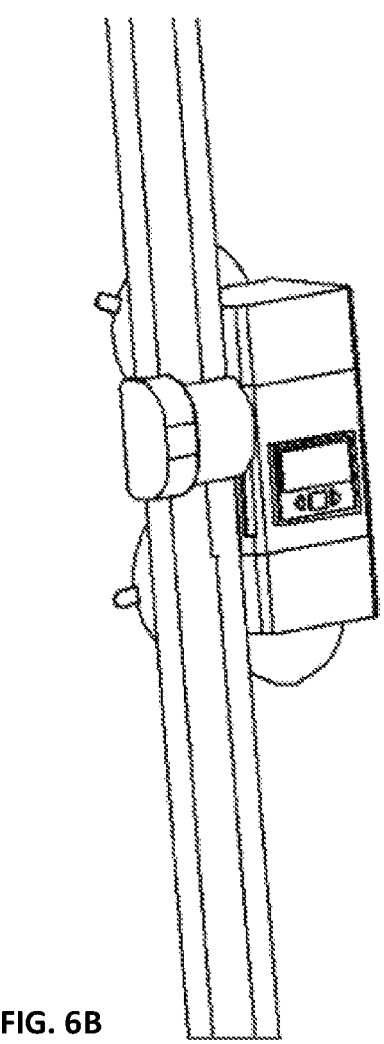
In FIG. 6B, there is shown an exemplary, electric spiraling piston utilizing, auto shade device, connected to an auto shade, shown in a second perspective, in accordance with some embodiments of the present invention.

In FIG. 6B, there is shown an exemplary, electric spiraling piston utilizing, auto shade device, connected to an auto shade, shown in a second perspective, in accordance with some embodiments of the present invention. The electric piston, and the auto shade connected thereto, are shown in a retracted/closed position.

Figure 7A:
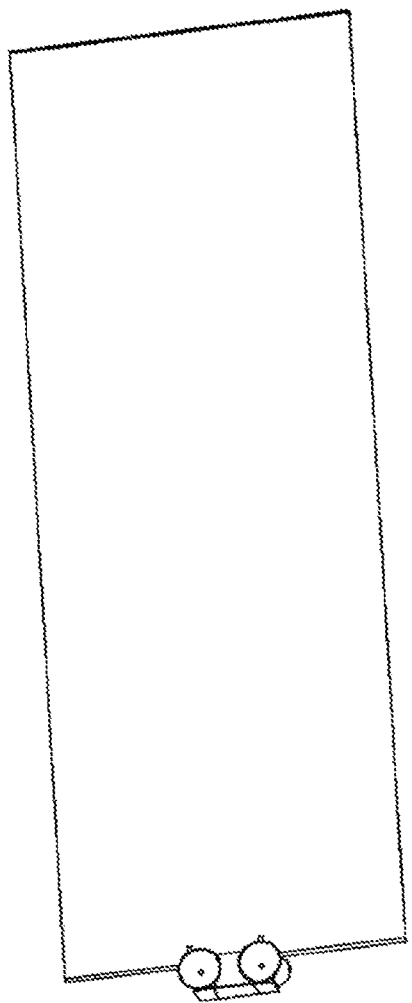
In FIG. 7A, there is shown an exemplary, electric spiraling piston utilizing, auto shade device, connected to an open auto shade and shown from an 'out of car' perspective, in accordance with some embodiments of the present invention.

In FIG. 7A, there is shown an exemplary, electric spiraling piston utilizing, auto shade device, connected to an open auto shade and shown from an 'out of car' perspective, in accordance with some embodiments of the present invention.

Figure 7B:
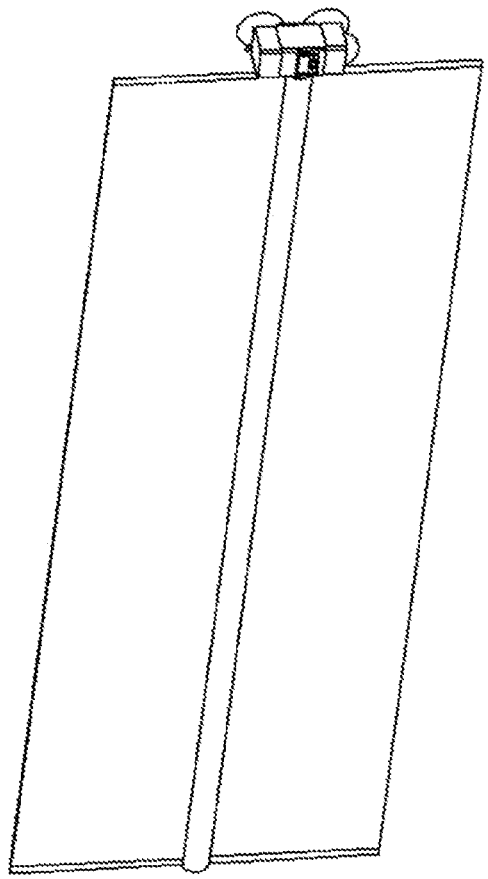
In FIG. 7B, there is shown an exemplary, electric spiraling piston utilizing, auto shade device, connected to an open auto shade and shown from an 'inside of a car' perspective, in accordance with some embodiments of the present invention.

In FIG. 7B, there is shown an exemplary, electric spiraling piston utilizing, auto shade device, connected to an open auto shade and shown from an 'inside of a car' perspective, in accordance with some embodiments of the present invention.

Figure 8:
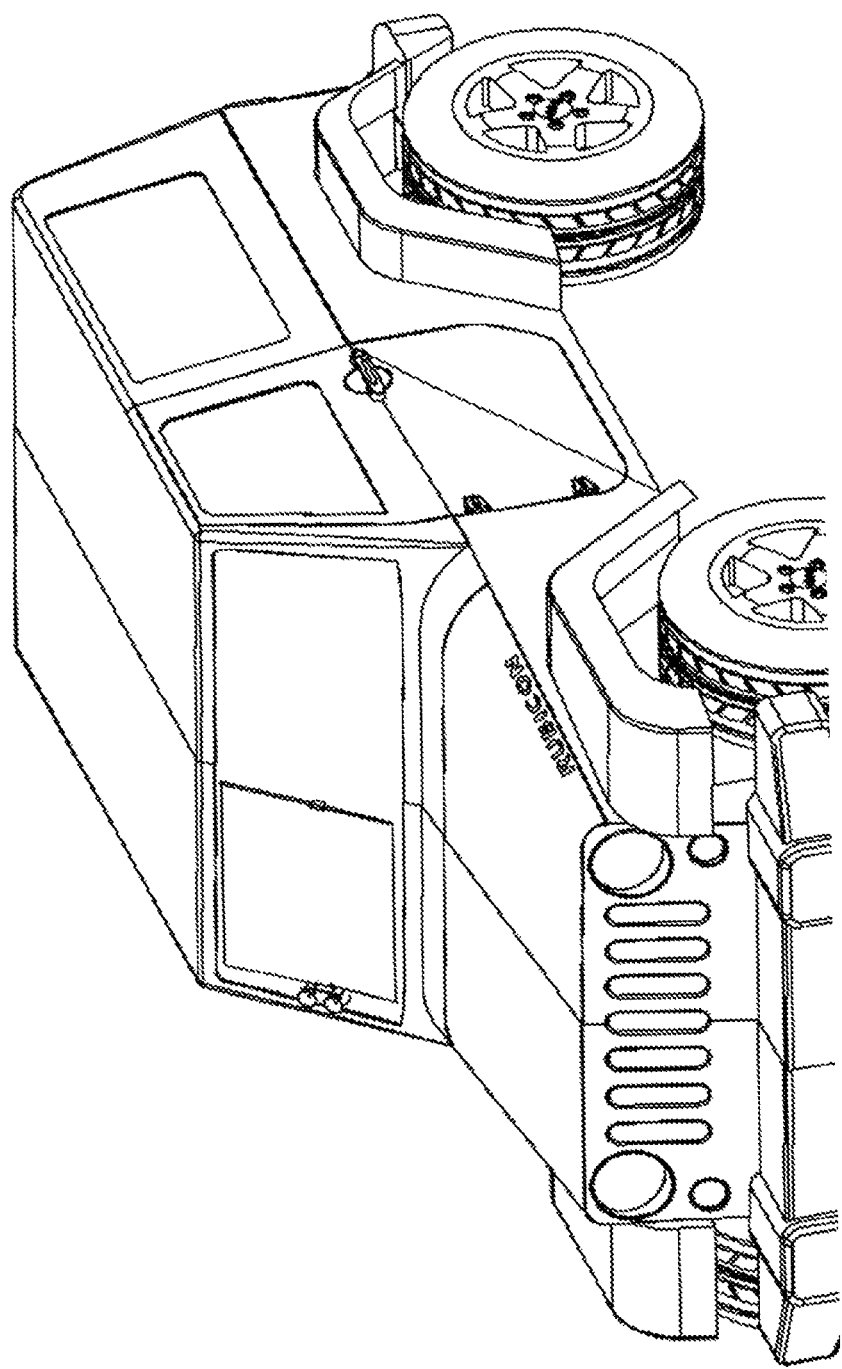
In FIG. 8, there is shown an exemplary, electric spiraling piston utilizing, auto shade device, connected to a partially open auto shade, wherein the device is shown installed on the wind shield (front window) of a car, in accordance with some embodiments of the present invention.

In FIG. 8, there is shown an exemplary, electric spiraling piston utilizing, auto shade device, connected to a partially open auto shade, wherein the device is shown installed on the wind shield (front window) of a car, in accordance with some embodiments of the present invention.

An electric spiraling piston unit, in accordance with some embodiments of the present invention, may comprise: (a) a drum around which the piston is spiraled when in a retracted orientation, the drum positioned within a piston housing; and (b) an electric motor having a drive shaft connected to a central axis of the drum such that motor torque, when connected to a power source, is relayed to the axis causing the drum to spin, wherein, when the drum is span by the motor in a first direction the piston un-spirals and extracts out of the piston housing in a straight orientation and when span by the motor in a second direction the piston spirals around the drum and retracts into said piston housing.

The piston may be shaped in the form of an elongated flat strip of material, biased to round its cross-section into an arched shape, providing the piston with cross rigidity when in a straight orientation.

The piston may be biased to round its cross-section into an arched shaped selected from the group consisting of: a one-centered arch, a two-centered arch, a three-centered arch, a four-centered arch, a segmental arch, a pointed segmental arch, a pseudo three-centered arch and a pseudo four-centered arch.

Figure 9A:
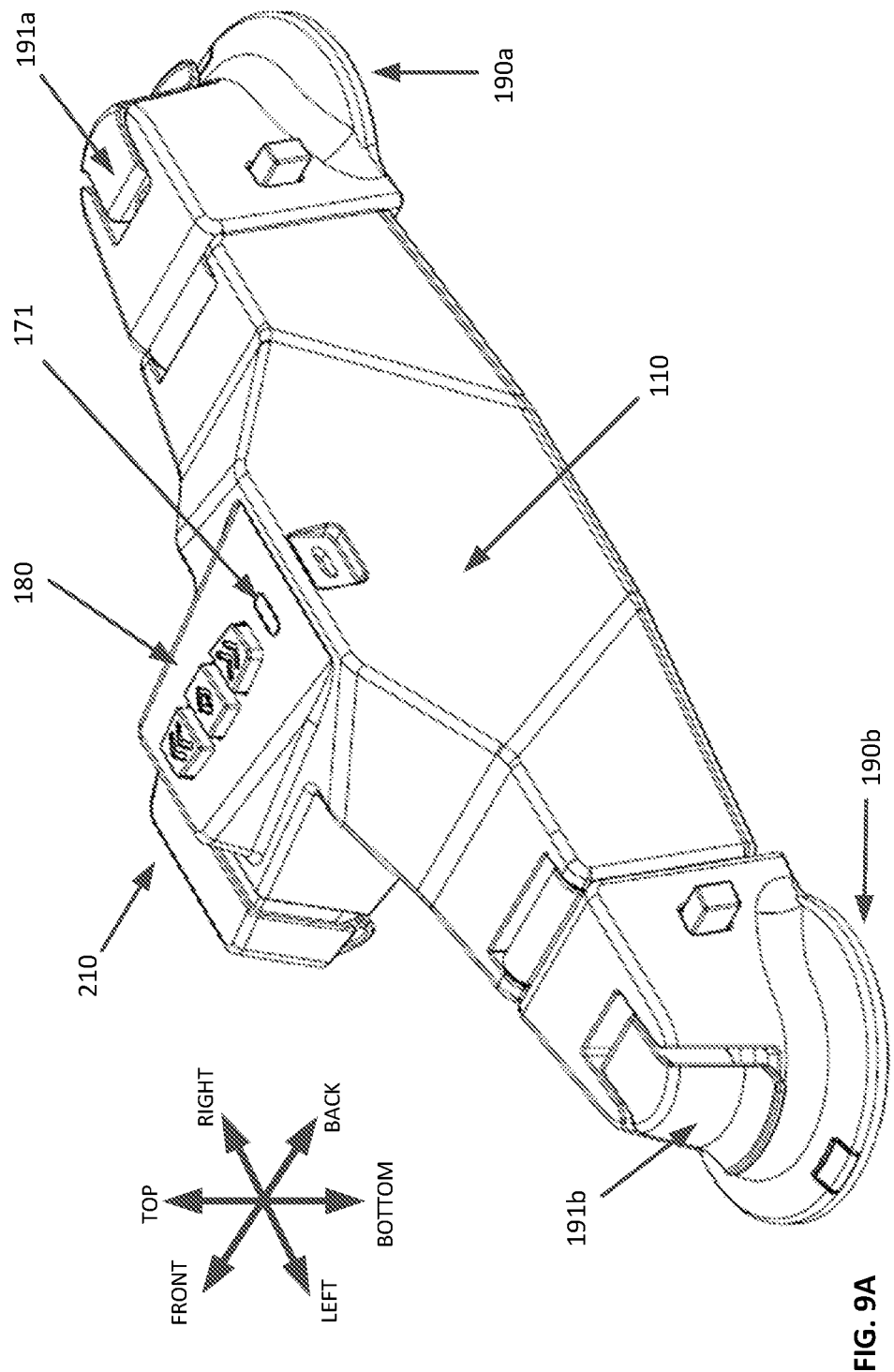
In FIG. 9A, there is shown a first perspective of an exemplary electric spiraling piston unit, in accordance with some embodiments of the present invention.

In FIG. 9A, there is shown a first perspective of an exemplary electric spiraling piston unit, in accordance with some embodiments of the present invention. In the figure, the back and top sides of the unit are shown, including: a housing body (110), a right (190a) and a left (190b) surface/window connection plugs and respective levers (191a, 191b) for vacuum generation, a user control panel (180) at the top of the unit and, at the front of the unit, a connector component (210) retained to the tip of the piston that is retracted in a spiraled position within the housing (110). Further shown is a charging socket (e.g. USB C, other) (171) for connecting an external charger to charge a battery powering the piston unit components and motor.

For purposes of reference from within the description of this figure and the following figures—the orientation of the electric spiraling piston unit is indicated by the thick double arrowed lines in FIG. 1A, pointing in the directions of right-left, top-bottom, and front-back, in reference of the shown unit.

Figure 9B:
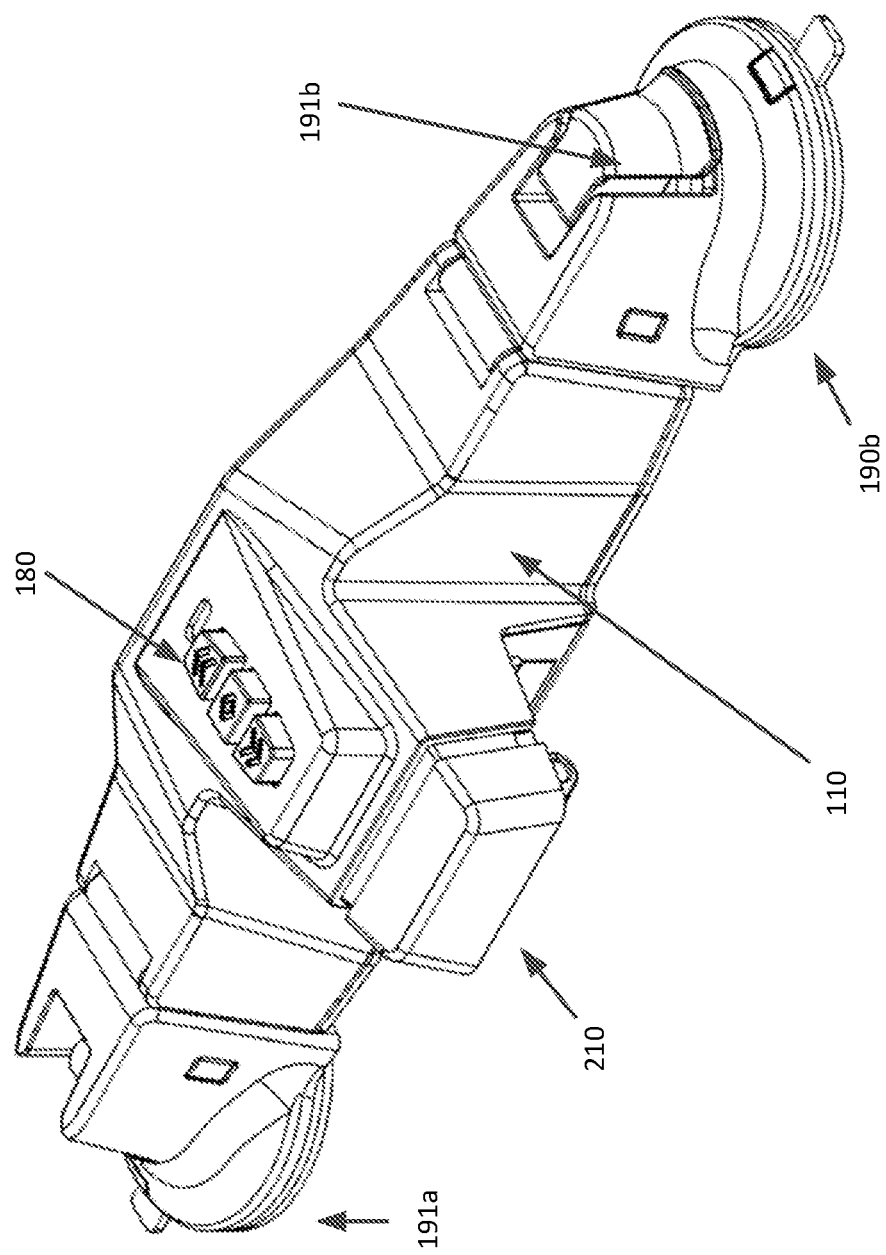
In FIG. 9B, there is shown a second perspective of an exemplary electric spiraling piston unit, in accordance with some embodiments of the present invention.

In FIG. 9B, there is shown a second perspective of an exemplary electric spiraling piston unit, in accordance with some embodiments of the present invention. In the figure, the front and top sides of the unit are shown, including: the housing body (110), the right (190a) and the left (190b) surface/window connection plugs and the respective levers (191a, 191b) for vacuum generation, the user control (180) panel at the top of the unit and, at the front of the unit, the connector component (210) retained to the tip of the piston that is retracted in a spiraled position within the housing (110).

Figure 9C:
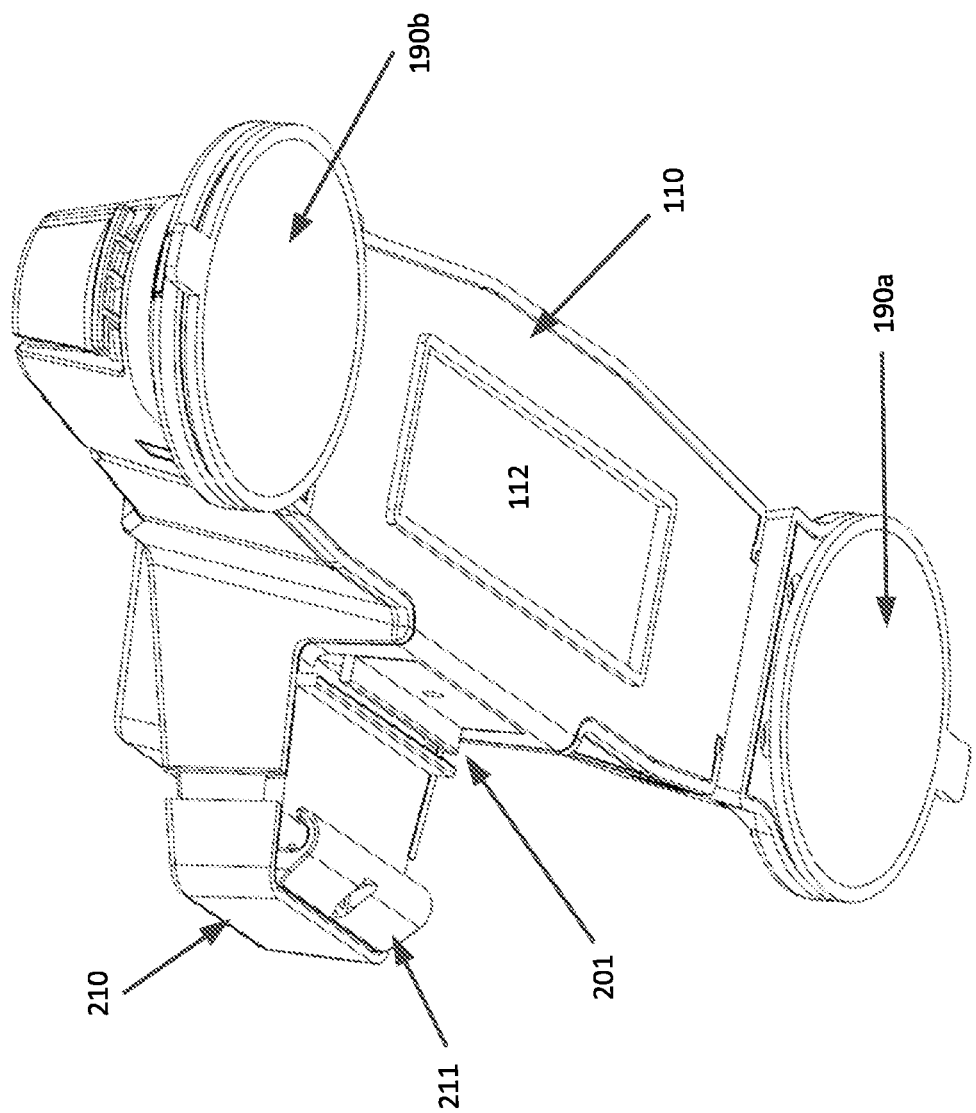
In FIG. 9C, there is shown a third perspective of an exemplary electric spiraling piston unit, in accordance with some embodiments of the present invention.

In FIG. 9C, there is shown a third perspective of an exemplary electric spiraling piston unit, in accordance with some embodiments of the present invention. In the figure, the front and bottom sides of the unit are shown, including: the housing body (110), the bottoms of right (190a) and the left (190b) surface/window connection plugs, and, at the front of the unit, the connector component (210) retained to the tip of the piston that is retracted in a spiraled position within the housing (110). The connector component (210) is shown to include a connection element/hook (211) at its bottom and the housing is shown to likewise include connection elements/walls (201) under a location of exit and entry of the piston from and into the housing (110).

Further shown, on the bottom of the housing (110), is a solar panel (112) for providing electric power to the unit and/or for charging a battery providing the unit with power. When connected to the inside of a window, for example a car's windshield, using the connection plugs (190a, 190b), the solar panel (112) at the bottom of the unit is oriented to face outside through the window and receive light/sun.

Figure 10A:
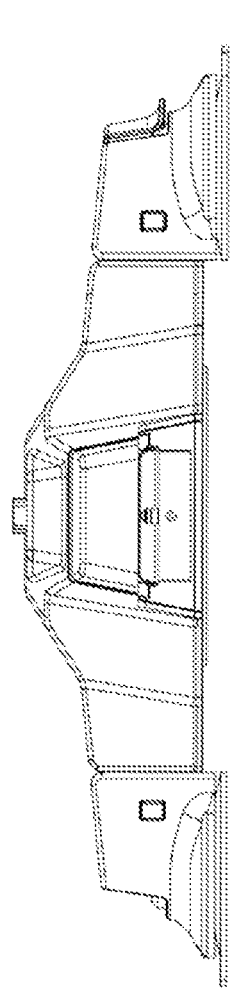
In FIG. 10A, there is shown a front view of an exemplary electric spiraling piston unit, in accordance with some embodiments of the present invention, wherein a connector component is shown.

In FIG. 10A, there is shown a front view of an exemplary electric spiraling piston unit, in accordance with some embodiments of the present invention, wherein the connector component is shown.

Figure 10B:
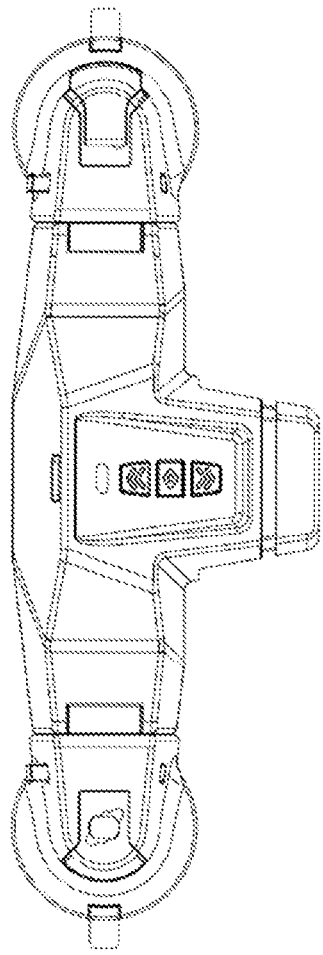
In FIG. 10B, there is shown a top view of an exemplary electric spiraling piston unit, in accordance with some embodiments of the present invention, wherein a user control panel at the top of the unit is shown.

In FIG. 10B, there is shown a top view of an exemplary electric spiraling piston unit, in accordance with some embodiments of the present invention, wherein the user control panel at the top of the unit is shown.

Figure 10C:
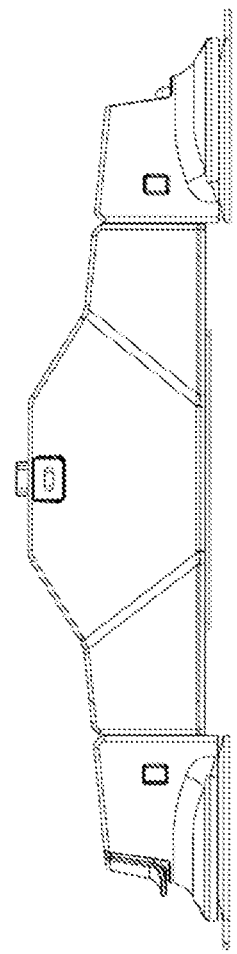
In FIG. 10C, there is shown a back view of an exemplary electric spiraling piston unit, in accordance with some embodiments of the present invention, wherein a back section of the unit's housing is shown.

In FIG. 10C, there is shown a back view of an exemplary electric spiraling piston unit, in accordance with some embodiments of the present invention, wherein the back of the unit's housing is shown.

Figure 11B:
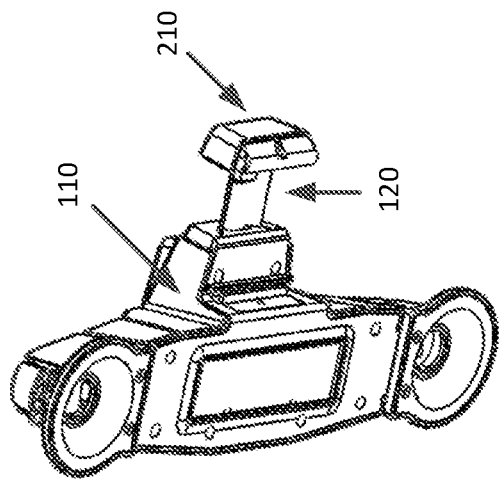
In FIG. 11B, there is shown a bottom perspective of an exemplary electric spiraling piston unit, in accordance with some embodiments of the present invention, wherein the spiraling piston is partially extracted out of the housing while retaining a straight orientation.
Figure 11A:
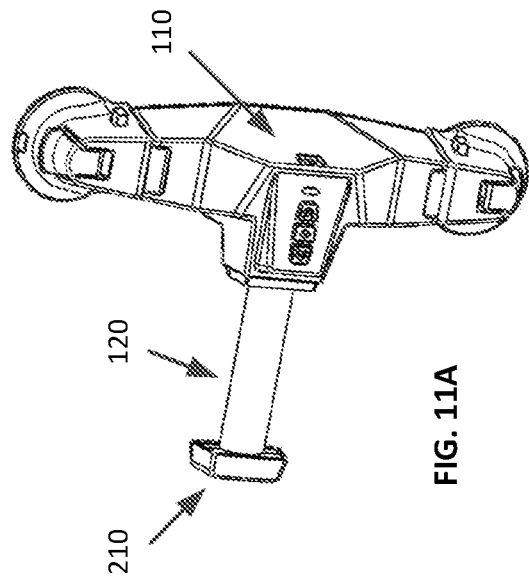
In FIG. 11A, there is shown a top perspective of an exemplary electric spiraling piston unit, in accordance with some embodiments of the present invention, wherein the spiraling piston is partially extracted out of the housing while retaining a straight orientation.

In FIG. 11A, there is shown a top perspective of an exemplary electric spiraling piston unit, in accordance with some embodiments of the present invention, wherein the spiraling piston (120) is partially extracted out of the housing (110) while retaining a straight orientation. The connector component (210) is shown to be connected to, and travel along with, the tip of the extracted piston (120).

In FIG. 11B, there is shown a bottom perspective of an exemplary electric spiraling piston unit, in accordance with some embodiments of the present invention, wherein the spiraling piston (120) is partially extracted out of the housing (110) while retaining a straight orientation. The connector component (210) is shown to be connected to, and travel along with, the tip of the extracted piston (120).

Figure 11C:
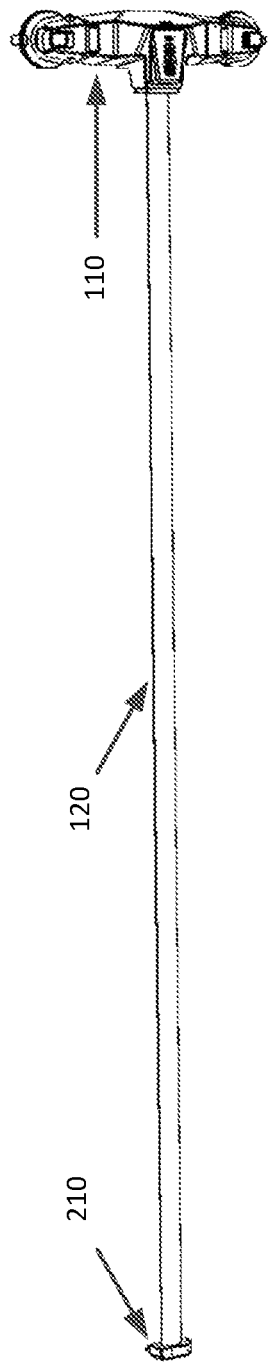
In FIG. 11C, there is shown a top view of an exemplary electric spiraling piston unit, in accordance with some embodiments of the present invention, wherein the spiraling piston is fully extracted out of the housing while retaining a straight orientation.

In FIG. 11C, there is shown a top view of an exemplary electric spiraling piston unit, in accordance with some embodiments of the present invention, wherein the spiraling piston (120) is fully extracted out of the housing (110) while retaining a straight orientation. The connector component (210) is shown to be connected to, and travel along with, the tip of the extracted piston (120).

The piston housing, in accordance with some embodiments, may include the drum around which the piston is spiraled and may further include one or more outer-drums positioned around, and in parallel orientation to, the drum, such that when said piston is spiraled around the drum, an external/bottom side of the piston contacts the one or more outer-drums.

The drum, and the outer-drums, may each comprise a gear retained to its base; wherein each of the outer-drums gears is intermeshed with the drum gear, such that when the drum is span by the motor, rotational motion is transmitted from the drum gear to the outer drums gears causing the outer drums to spin in a direction opposite to the spinning direction of the drum.

The piston housing, in accordance with some embodiments, may for example include 3 outer-drums. The outer-drums may be positioned at similar distances from each other and at similar distances from the drum.

Figure 12:
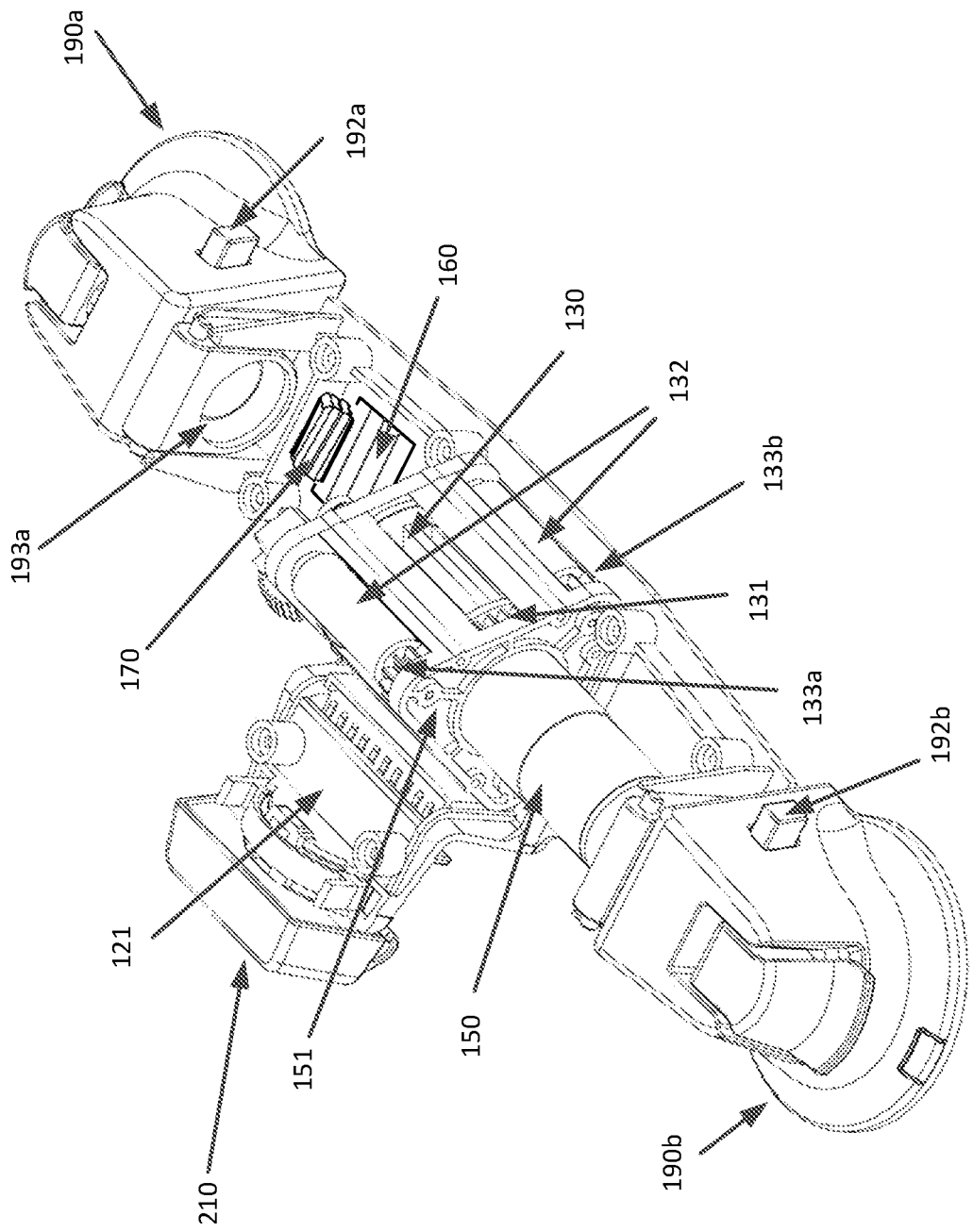
In FIG. 12, there is shown a perspective of an exemplary electric spiraling piston unit, in accordance with some embodiments of the present invention, wherein the top part of the housing has been removed and internal components of the unit are shown.

In FIG. 12, there is shown a perspective of an exemplary electric spiraling piston unit, in accordance with some embodiments of the present invention, wherein the top part of the housing has been removed and internal components of the unit are shown.

Shown in the figure are the right and the left surface/window connection plugs (190a, 190b) and respective levers (190a, 190b) for vacuum generation, and the connector component (210) retained to the tip of the piston (120). The surface/window connection plugs (190a, 190b), in accordance with embodiments, may pivot in relation to the piston and motor housing (110) section of the unit. In the figure, a right plug pivot axis/connection (a left plug pivot axis/connection is not visible) (193a)— around which the surface/window connection plug pivots—is shown. Accordingly, when the unit is connected to a window with either one, or both, of the connection plugs (190a, 190b), the piston and motor housing section (110) may be pivoted to direct the connector component (210), and thus a piston or a curtain connected thereto, either down and further towards the window, or up and further away from the window. When the aspired angle between the piston-and-motor-housing (110) section and the connection plugs (190a, 190b) is set/reached, the shown right and left connection plugs locks (192a, 192b) may be pressed and engaged for retaining the set angle.

Within the open housing, there are further shown: The electric motor (150) retained to a motor mount (151), the drum (130) and outer drums (132) positioned within the motor mount (151) and functionally/mechanically associated with the motor (150), the unit's electric-circuitry/control-logic/controller (160), a battery (170) for providing electric power to the unit's motor and other electric components and, the unit's spiraling piston exit/entry opening/slot/area (121).

The drum (130), and the outer-drums (132), are shown to each comprise a gear retained to its base; wherein each of the outer-drums gears (133a, 133b, 133c not visible) is intermeshed with the drum gear (131), such that when the drum (130) is span by the motor (150), rotational motion is transmitted from the drum gear (131) to the outer drums gears (1333a, 133b, 133c not visible) causing the outer drums (132) to spin in a direction opposite to the spinning direction of the drum (130), thereby assisting the un-spiraling and extraction of the spiraling piston (120) out of the piston housing (110), and optionally, the spiraling and retraction of the spiraling piston (120) into the piston housing (110).

The drum gear, in accordance with embodiments, may be independently connected to the drive-shaft/axis of the motor with a one way bearing, such that: (1) when the motor spins in a first—piston extraction—direction the drum gear is engaged by the one way bearing and spins therewith, transmitting its spinning motion to the outer-drums gears thus causing the outer-drums to likewise spin, in an opposite direction to the main drum's spinning, assisting piston extraction; and (2) when the motor spins in a second—piston retraction—direction the drum gear is not engaged by the one way bearing and does not spin along with the motor drive-shaft/axis and the drum, as a result no spinning motion is transmitted to the outer-drums gears and on to their respective outer-drums.

According to some embodiments, an electric spiraling piston unit may utilize various alternative mechanisms for uni-directional transmission, or transmission disengagement, of rotary motion. Such mechanisms may include any, or a combination of: a one way bearing, a ratchet mechanism, a differential mechanism, multi gears/bands transmission ratio, and/or any other mechanism facilitating the transmission of a first element's rotary motion of a first speed, onto a second element's rotary motion at a second, different, speed.

Figure 13A:
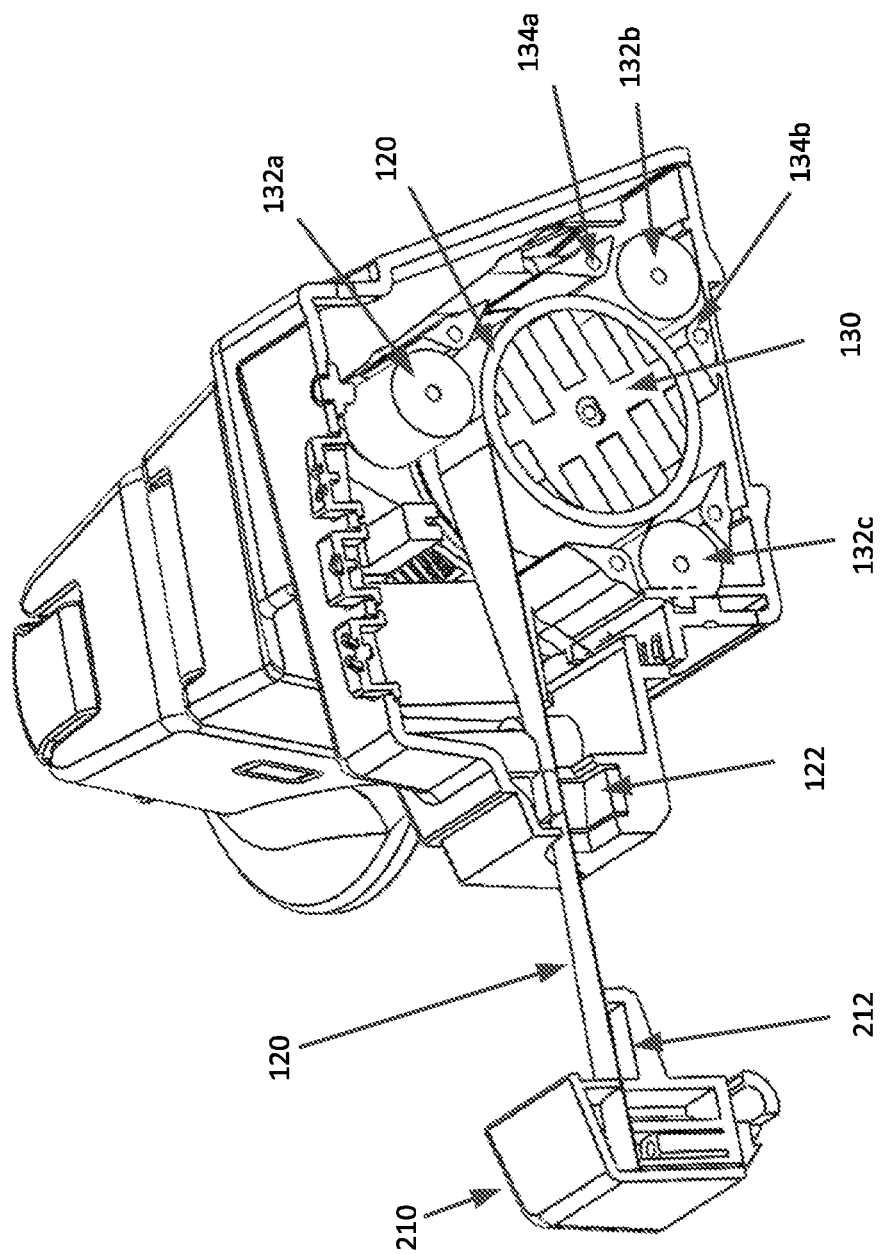
In FIG. 13A, there is shown a first cross-section view—looking from the left side of the unit towards and into the right side of the unit—of an exemplary electric spiraling piston unit, in accordance with some embodiments of the present invention, wherein the piston extraction and retraction mechanism, and the internal components, of the unit are shown in further detail.

In FIG. 13A, there is shown a first cross-section view—looking from the left side of the unit towards and into the right side of the unit—of an exemplary electric spiraling piston unit, in accordance with some embodiments of the present invention, wherein the piston extraction and retraction mechanism, and the internal components, of the unit are shown in further detail.

In the figure, a cross-section view of the drum (130), the outer drums (132a, 132b, 132c), the piston (120) and the connector component (130) is shown. The piston (120) is shown to be partially spiraled around the drum (130) and partially extracted in a straight orientation, along with the connector component (210) at the tip of the piston (120), forward of and away from the front of the unit.

The piston is shown to be spiraled around the drum (130), positioned between the drum (130) and the outer drums (132a, 132b, 132c). The rotational motion of the drum (130) is transmitted from the drum gear (131) to the outer drums gears (133a, 133b, 133c) causing the outer drums (132a, 132b, 132c) to spin in a direction opposite to the spinning direction of the drum (130). The spinning outer drums (132a, 132b, 132c) contact the outer surface of the spiraled piston (120), substituting or assisting the spinning drum (130) with the un-spiraling and extraction of the spiraling piston (120) out of the piston housing (110).

Further shown in the figure are barriers (134a, 134b), to the side(s) of the outer drums (132a, 132b, 132c), to guide the path of the spiraling/un-spiraling piston (120) between the drum (130) and the outer drums (132a, 132b, 132c), preventing the piston (120) from bending, over spiraling or otherwise getting stuck or tangled within the housing (110).

Further shown in the figure are a magnet (212), positioned within a slot/compartment on the connector component (210), and a metal plate (122) positioned at a piston entry/exit area (121), on the front of the unit, and electrically connected to the controller of the unit (160), such that upon retraction of the piston (120) and connection component (210) to position the magnet (212) over the metal plate (122), an electric signal is sent to the controller (160) to indicate full retraction of the piston (120). The controller (160) may, in response, terminate power to the motor (150), disengage the motor (150) from the drum (130) and/or register an indication of a fully retracted piston (120).

Figure 13B:
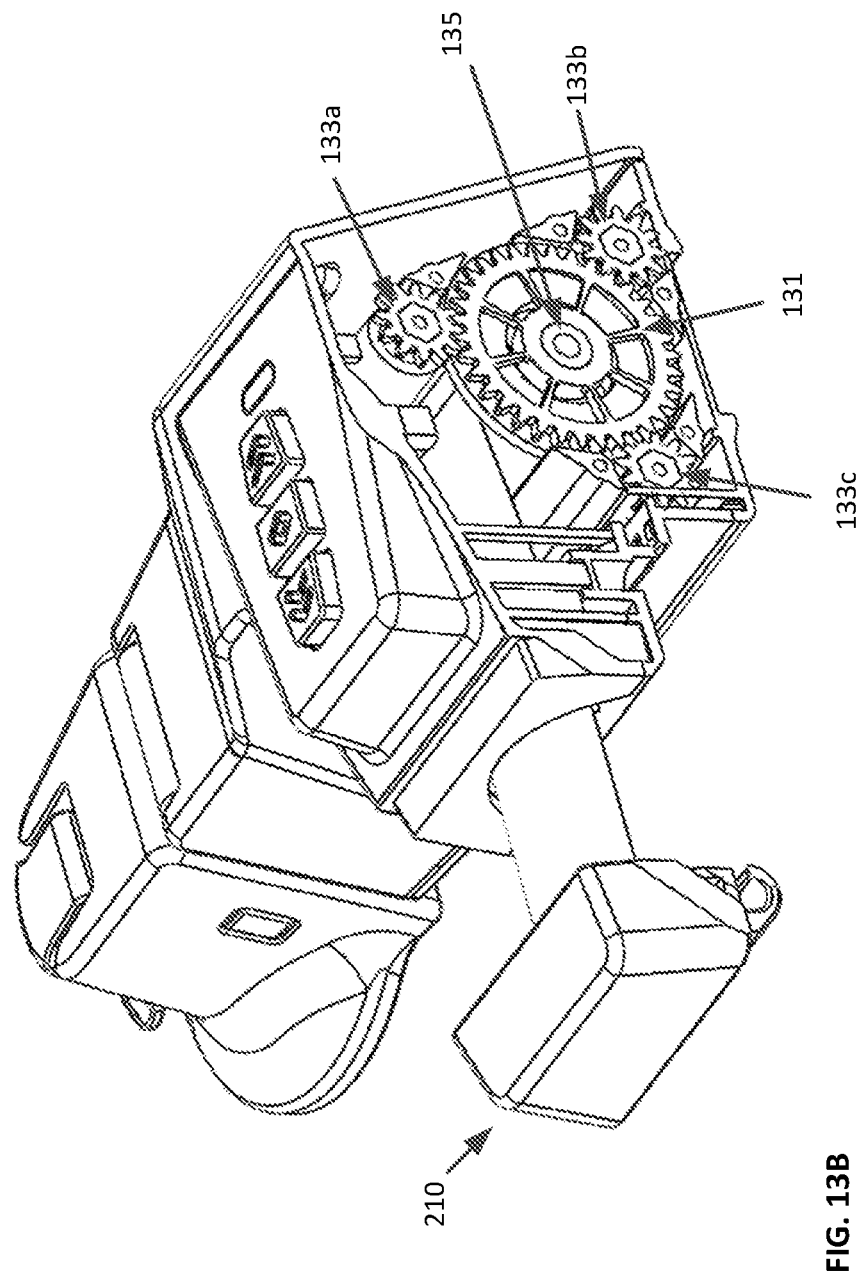
In FIG. 13B, there is shown a second cross-section view—looking from the left side of the unit towards and into the right side of the unit—of an exemplary electric spiraling piston unit, in accordance with some embodiments of the present invention, wherein the piston extraction and retraction mechanism, and the internal components, of the unit are shown in further detail.

In FIG. 13B, there is shown a second cross-section view—looking from the left side of the unit towards and into the right side of the unit—of an exemplary electric spiraling piston unit, in accordance with some embodiments of the present invention, wherein the piston extraction and retraction mechanism, and the internal components, of the unit are shown in further detail.

In the figure, a cross-section view of the drum gear (131) and the outer drums gears (133a, 133b, 133c) is shown. The piston (120) is shown to be partially spiraled around the drum and partially extracted in a straight orientation, along with the connector component (210) at the tip of the piston (120), forward of and away from the front of the unit. The rotational motion of the drum (130) is transmitted from the shown drum gear (131) to the shown outer drums gears (133a, 133b, 133c) causing the outer drums (132a, 132b, 132c) to spin in a direction opposite to the spinning direction of the drum (130).

The drum gear (131), is shown to be connected to the drive-shaft/axis of the motor (150) with a one way bearing (135), such that: (1) when the motor (150) spins in a first—piston extraction—direction the drum gear (spinning counterclockwise in the FIG. 131) is engaged by the one way bearing (135) and spins therewith, transmitting its spinning motion to the outer-drums gears (133a, 133b, 133c) thus causing the outer-drums (132a, 132b, 132c) to likewise spin, in an opposite direction (clockwise in the figure) to the main drum's (130) spinning, assisting piston (120) extraction; and (2) when the motor (150) spins in a second—piston retraction—direction the drum gear (131) is not engaged by the one way bearing (135) and does not spin along with the motor drive-shaft/axis and the drum (130), as a result no spinning motion is transmitted to the outer-drums gears (133a, 133b, 133c) and on to their respective outer-drums (132a, 132b, 132c).

Figure 13D:
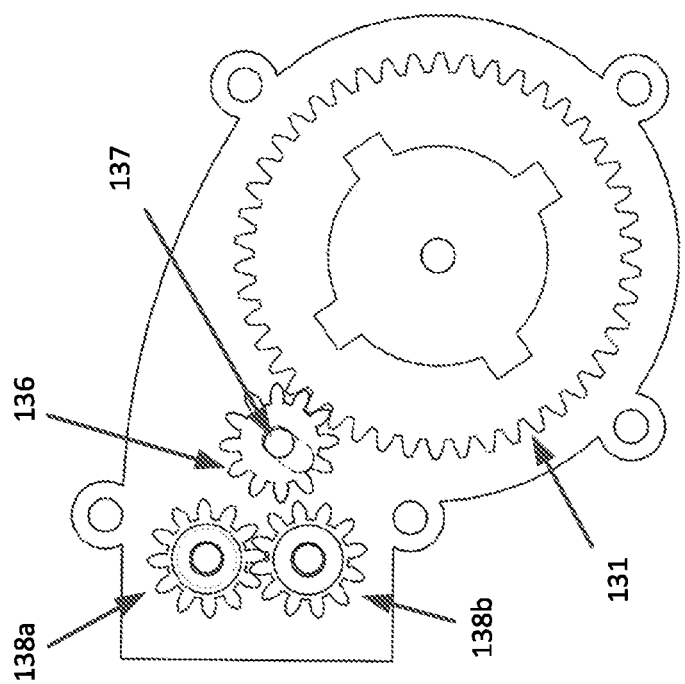
In FIG. 13D, there is shown a second schematic cross-section view—looking from the left side of the unit towards and into the right side of the unit—of an alternative exemplary drum gear disengagement mechanism, in accordance with some embodiments of the present invention.
Figure 13C:
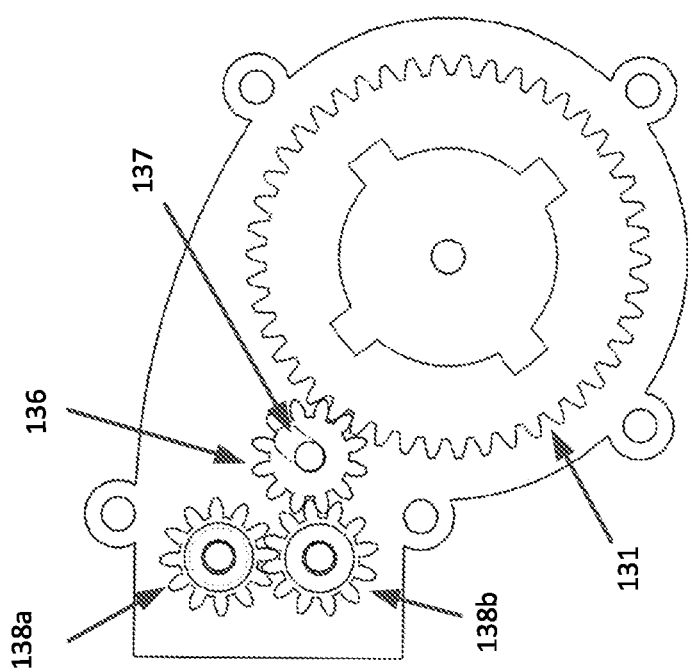
In FIG. 13C, there is shown a first schematic cross-section view—looking from the left side of the unit towards and into the right side of the unit—of an alternative exemplary drum gear disengagement mechanism, in accordance with some embodiments of the present invention.

In FIG. 13C, there is shown a first schematic cross-section view—looking from the left side of the unit towards and into the right side of the unit—of an alternative exemplary drum gear disengagement mechanism, in accordance with some embodiments of the present invention. The shown drum gear (131), when turning counterclockwise and extracting the piston (120), also spins the intermeshed central gear (including no drum) (136) shown, that in turn spins the bottom-drum gear (138b) that spins top-drum gear (138a). The spinning bottom-drum and top-drum substitute/assist the spinning drum (130) with piston extraction by their pull on the spiraled piston (120) towards and out of the piston opening (in the direction of the arrow) (121).

In FIG. 13D, there is shown a second schematic cross-section view—looking from the left side of the unit towards and into the right side of the unit—of an alternative exemplary drum gear disengagement mechanism, in accordance with some embodiments of the present invention. The shown drum gear (131), when turning clockwise and retracting the piston (120), causes the previously intermeshed central gear (including no drum) (136) to move/rise, along with its rotation axis, within the shown central gear axis slot (137) to a position at which the central gear (136) is no longer intermeshed with the drum gear (131), thereby disengaging the bottom and top drum gears (138b, 138a) and their respective drums.

In FIG. 14A, there is shown a flowchart of the main steps executed as part of an exemplary extracting operation of an electric spiraling piston using a one way bearing (700), in accordance with some embodiments of the present invention. Shown steps include: (1) Motor spins in a first—piston extraction—direction (710); (2) Drum gear is engaged by the one way bearing and spins therewith (720); (3) Spinning motion transmitted from drum gear to the outer-drums gears (730); and (4) Outer-drums gears spin their respective drums in an opposite direction to the drum's spinning (740).

In FIG. 14B, there is shown a flowchart of the main steps executed as part of an exemplary retracting operation of an electric spiraling piston using a one way bearing (800), in accordance with some embodiments of the present invention. Shown steps include: (1) Motor spins in a second—piston retraction—direction (810); (2) Drum gear is not engaged by the one way bearing and spins therewith (820); (3) No motion transmitted from drum gear to the outer-drums gears (830); and (4) Drum spins while outer-drums gears and their respective outer-drums do not spin (840).

According to some embodiments, the piston housing may further contain a potentiometer functionally associated with the drum axis and/or the motor shaft, for calculating/estimating, based on measured electric resistance level, the length of a segment of the piston that is extracted out of the piston housing.

According to some embodiments, the function of a potentiometer as described herein may be assisted and/or substituted by other mechanisms utilized for calculating/estimating the length of a segment of the piston that is extracted out of the piston housing. Such mechanisms may for example include an encoder—such as an optic encoder, a magnetic encoder and/or an absolute encoder; a step-motor measuring its own rotational movement; and/or other.

Figure 15:
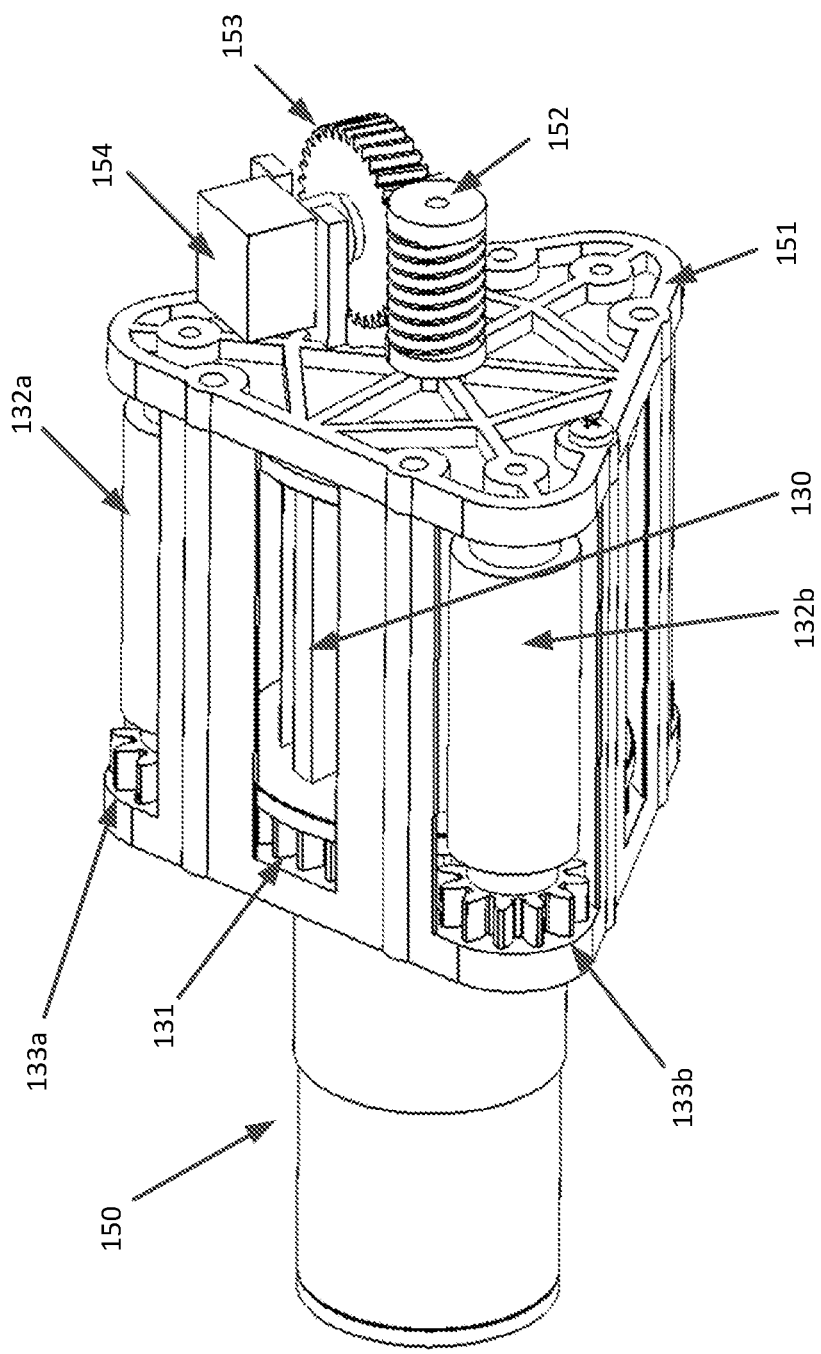
In FIG. 15 there is shown a perspective view of a mounted motor, of an exemplary electric piston unit, in accordance with some embodiments.

In FIG. 15 there is shown a perspective view of a mounted motor, of an exemplary electric piston unit in accordance with some embodiments, including a potentiometer for calculating/estimating the length of a segment of said piston that is extracted out of said piston housing. In the figure, the motor (150) is shown to be connected to the motor mount (151) on one side; the drums and drum gears are shown to be connected within the mount (151), the drum (130) positioned at the middle of the mount (151) and the outer drums (132a, 132b, 132c not visible) positioned, in parallel to the drum (130), at the corners of the mount (151); and a potentiometer (154) connected to the opposite side of the mount.

The shown potentiometer (154) includes a screw component (152), connected to the motor shaft and/or drum axis, and spinning along with it as the piston (120) is extracted or retracted in and out of the unit housing (110). The spinning screw component (152) spins the intermeshed potentiometer gear (153) shown, to vary the resistance of the potentiometer (154) in accordance with the extent to which the piston (120) is currently extracted/retracted.

The potentiometer (154) output values signal may be relayed to the unit controller (160), wherein the controller may: (1) monitor the signals to trigger an automatic motor power halt/disconnection upon the monitored output values reaching and/or going above/under a predefined threshold value; (2) monitor the signals to trigger an automatic user notification (e.g. a light or sound indication by the unit) upon the monitored output values reaching and/or going above/under a predefined threshold value such as, for example, an output reference value preset by a user as representing a specific aspired level (e.g. maximal level) of piston extraction; and/or (3) communicate the potentiometer output values signal, or a digital data stream representation thereof, to a user mobile device application and/or other user system application (e.g. home computer, car computer) for analysis and user notification by the user application.

Figure 16:
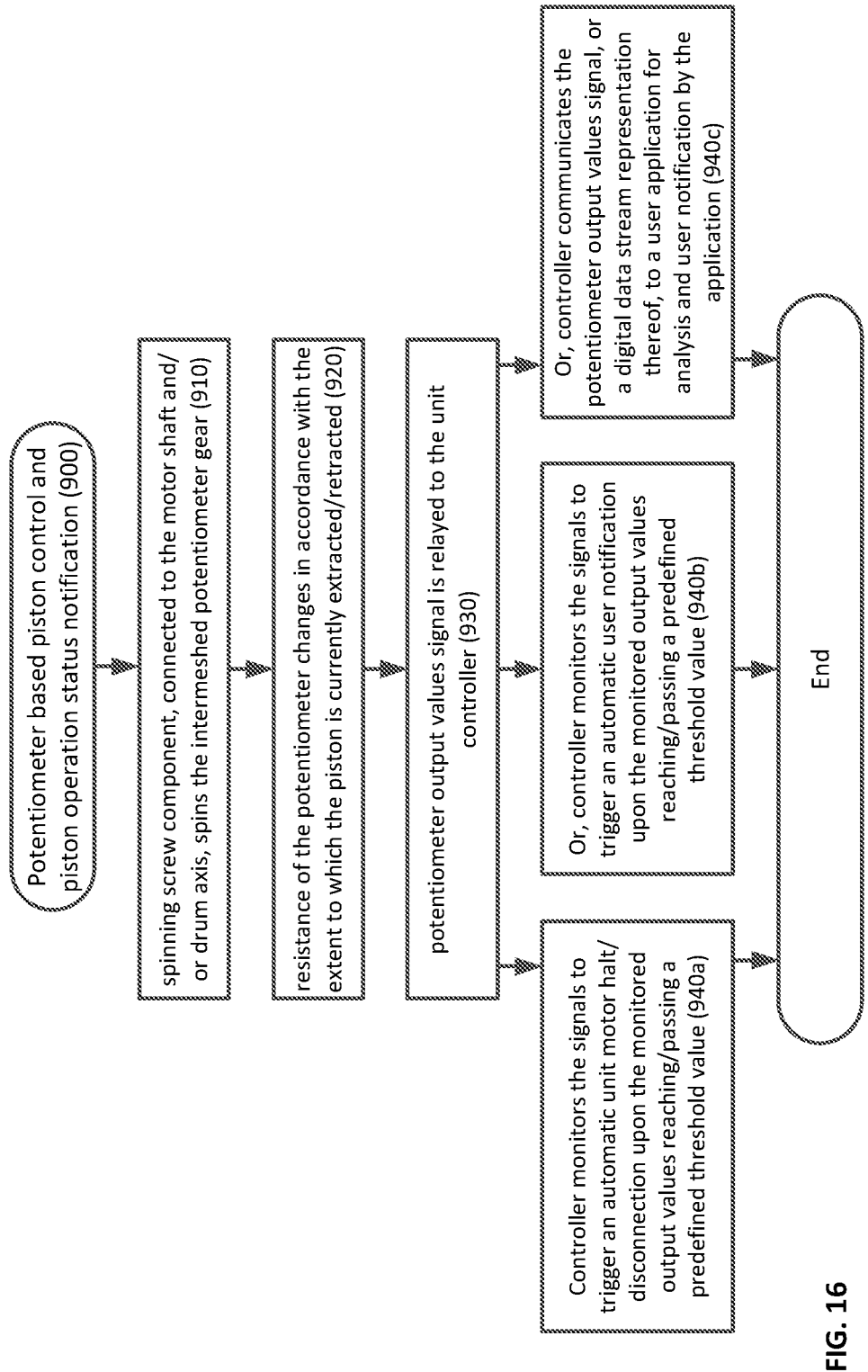
In FIG. 16, there is shown a flowchart of the main steps executed as part of an exemplary potentiometer-based process for piston control and piston operation status notification.

In FIG. 16, there is shown a flowchart of the main steps executed as part of an exemplary potentiometer-based process for piston control and piston operation status notification (900). Shown steps include: (1) spinning screw component, connected to the motor shaft and/or drum axis, spins the intermeshed potentiometer gear (901); (2) resistance of the potentiometer changes in accordance with the extent to which the piston is currently extracted/retracted (902); (3) potentiometer output values signal is relayed to the unit controller (930). The unit controller then: (4) monitors the signals to trigger an automatic unit motor halt/disconnection upon the monitored output values reaching/passing a predefined threshold value (940*a*); or, (5) monitors the signals to trigger an automatic user notification upon the monitored output values reaching/passing a predefined threshold value (940*b*); or, (6) communicates the potentiometer output values signal, or a digital data stream representation thereof, to a user application for analysis and user notification by the application (940*c*).

A motorized curtain, in accordance with some embodiments, may comprise: a curtain including: (a) a rollable rectangular sheet; (b) a first curtain pole connected to a first side/edge of the rectangular sheet; and/or (c) a second curtain pole connected to a second, opposite, side edge of said rectangular sheet.

The motorized curtain may further comprise an electric spiraling piston unit including: (a) a drum around which a piston is spiraled when in a retracted orientation, the drum positioned within a piston housing; (b) an electric motor having a drive shaft connected to a central axis of the drum such that motor torque is relayed to the axis causing the drum to spin, wherein, when the drum is span by the motor in a first direction the piston un-spirals and extracts out of the piston housing in a straight orientation and when span by the motor in a second direction the piston spirals around the drum and retracts into the piston housing; (c) a first curtain connector for retaining the piston housing to the first curtain pole; (d) a second curtain connector for retaining a tip, or a connection component, of the piston to the second curtain pole, such that upon extraction of the piston by the motor, the first curtain pole remains stationary and connected to the piston housing and the second curtain pole travels, along with and with support of the piston tip, away from the piston housing—thereby unrolling the rectangular sheet from a rolled position (e.g. within a curtain collection container, around a central curtain collection pole) to an unrolled position, thereby closing the curtain; and/or (e) an electric power source such as a rechargeable battery or an auxiliary power connection to power the motor and other unit components.

According to some embodiments, the piston housing may further include one or more window attachment components for attaching the piston housing to a surface of a window. The attachment components may for example be selected from the group consisting of: a vacuum-based mechanism, an adhesive based mechanism, a magnet based mechanism, a screw based mechanism, a pin based mechanism and/or other.

According to some embodiments, the electric spiraling piston may further include one or more solar panels positioned on an outer surface of the piston housing, for charging the rechargeable battery, such that upon attaching the piston housing to the inner surface of a window by the window attachment components, the solar panels face at the general direction of the outside of the window.

According to some embodiments, the electric spiraling piston may further include a camera positioned on an outer surface of the unit's piston housing, such that upon attaching the unit to the surface of a window by the window attachment components, the camera faces the window.

In FIG. 17A there is shown a top perspective of an exemplary motorized car curtain, shown in a retracted curtain position and including an electric spiraling piston unit as described herein and a rollable curtain, in accordance with some embodiments.

The rollable curtain is shown to include a first curtain pole (320*a*) connected to a first edge (310*a*) of the rectangular sheet (300); a second curtain pole (320*b*) connected to a second, opposite, edge (310*b*) of the rectangular sheet (300); and a third, central spring biased pole/tube (330) around which the sheet (300) is rolled.

In FIG. 17B there is shown a bottom perspective of an exemplary motorized car curtain, shown in a retracted curtain position and including an electric spiraling piston unit as described herein and a rollable curtain, in accordance with some embodiments.

The rollable curtain's first curtain pole (320*a*) is shown to be retained by a hook (211) to the unit's connector component (210) on the tip of the piston (120), whereas the second, opposite, curtain pole (320*b*) is retained to a complementary connector/slot (200) on the front of the housing (111) of the unit. The curtain sheet (300) is rolled around the third, central, spring biased pole/tube (330).

In FIG. 18A there is shown a top perspective (e.g. looking from the inside of a car's window outward) of an exemplary motorized car curtain, shown in an extracted curtain position and including an electric spiraling piston unit as described herein and a rollable curtain, in accordance with some embodiments.

The first curtain pole (320*a*) in the figure is shown to have now traveled along with the connector component (210) at the tip of the piston (120) as the piston extracted, to spread and open the curtain (300); as the second, opposite, curtain pole (320*b*) remained retained to the connector on the front of the unit housing (110).

Accordingly, when connected along the edge of a window with the connection plugs, the unit's extracting piston stretches the curtain to open across the window, while supporting its position and orientation relative to the unit and the curtained window.

In FIG. 18B there is shown a bottom perspective (e.g. looking from the outside of a car's window inward) of an exemplary motorized car curtain, shown in an extracted curtain position and including an electric spiraling piston unit as described herein and a rollable curtain, in accordance with some embodiments.

The first curtain pole (320*a*) in the figure is shown to have now traveled along with the connector component (210) at the tip of the piston (shown sticking out behind the edge of the curtain sheet (300)) as the piston (120) extracted, to spread and open the curtain (300); as the second, opposite, curtain pole (320*b*) remained retained to the connector (200) on the front of the unit housing (110).

In addition to the described rollable curtain, various other curtain types may be functionally integrated with or connected to a piston unit as described herein, to facilitate their opening and closing by the piston unit. For example: an accordion curtain may be integrated/connected with/to the piston unit, such that a first edge of the accordion curtain is connected to the connector component on the piston and a second edge of the accordion curtain is retained to the piston unit housing; a one side rolling curtain with an external axis may be integrated/connected with/to the piston unit, such that an edge of the rolling curtain is connected to the connector component on the piston and the external axis is retained to the piston unit housing; and/or a container enclosed rolling curtain may be integrated/connected with/to the piston unit, such that an edge of the rolling curtain is connected to the connector component on the piston and the enclosing container is retained to the piston unit housing.

A motorized curtain system, in accordance with some embodiments, may comprise: a rolling curtain as described herein; an electric spiraling piston unit as described herein integrated with or connected to the rolling curtain and further including communication circuitry; and a user mobile device, or computer, running a curtain system application.

The mobile/computer application may: (a) receive curtain operation commands through a device displayed, and/or a vocal, user interface; (b) communicate the received operation commands (e.g. over Wi-Fi, Bluetooth, other wired/wireless connection/network) to the spiraling piston unit communication circuitry for execution by the unit controller; (c) receive unit communicated indications/parameters in regard to the operation status of the unit and/or the piston and curtain; and/or (d) analyze the communicated indications/parameters to trigger and present user notifications and unit operation status related messages/illustrations.

According to some embodiments, the potentiometer, functionally associated with the drum, may measure specific electric resistance levels based on the drum's rotational orientation; the spiraling piston unit communication circuitry may relay data indicative of the measured electric resistance levels to a user communication device running the mobile/computer application; and the mobile/computer device application may: (a) calculate, based on a given measured electric resistance level, the length of a segment of the piston that is extracted out of the piston housing and, (b) visually present, over a screen of the user device, the length of the segment of the piston, or of the curtain connected thereto, that is extracted out of the piston housing, relative to a predefined length of a segment representing a full extraction of the piston.

According to some embodiments, the user device application may be further adapted to: (a) visually present, over the screen of the user device, a curtain operation user interface; (b) receive one or more piston extraction or retraction user commands through the curtain operation user interface and relay them to the electric spiraling piston unit; (c) receive a full extraction user indication through the curtain operation user interface; and (d) associate a given specific electric resistance level value, received at substantially the same time as the time when the full extraction user indication was received, with a full extraction of the piston. The user device application may be further adapted to: (e) receive a full extraction user command through the curtain operation user interface; (f) continuously extract the piston/curtain while monitoring the potentiometer resistance values changing as the piston extracts; and (g) upon the monitored resistance value reaching or passing the electric resistance level value associated with a full extraction of the piston/curtain, halting the operation of the motor to discontinue piston/curtain extraction.

Figure 19:
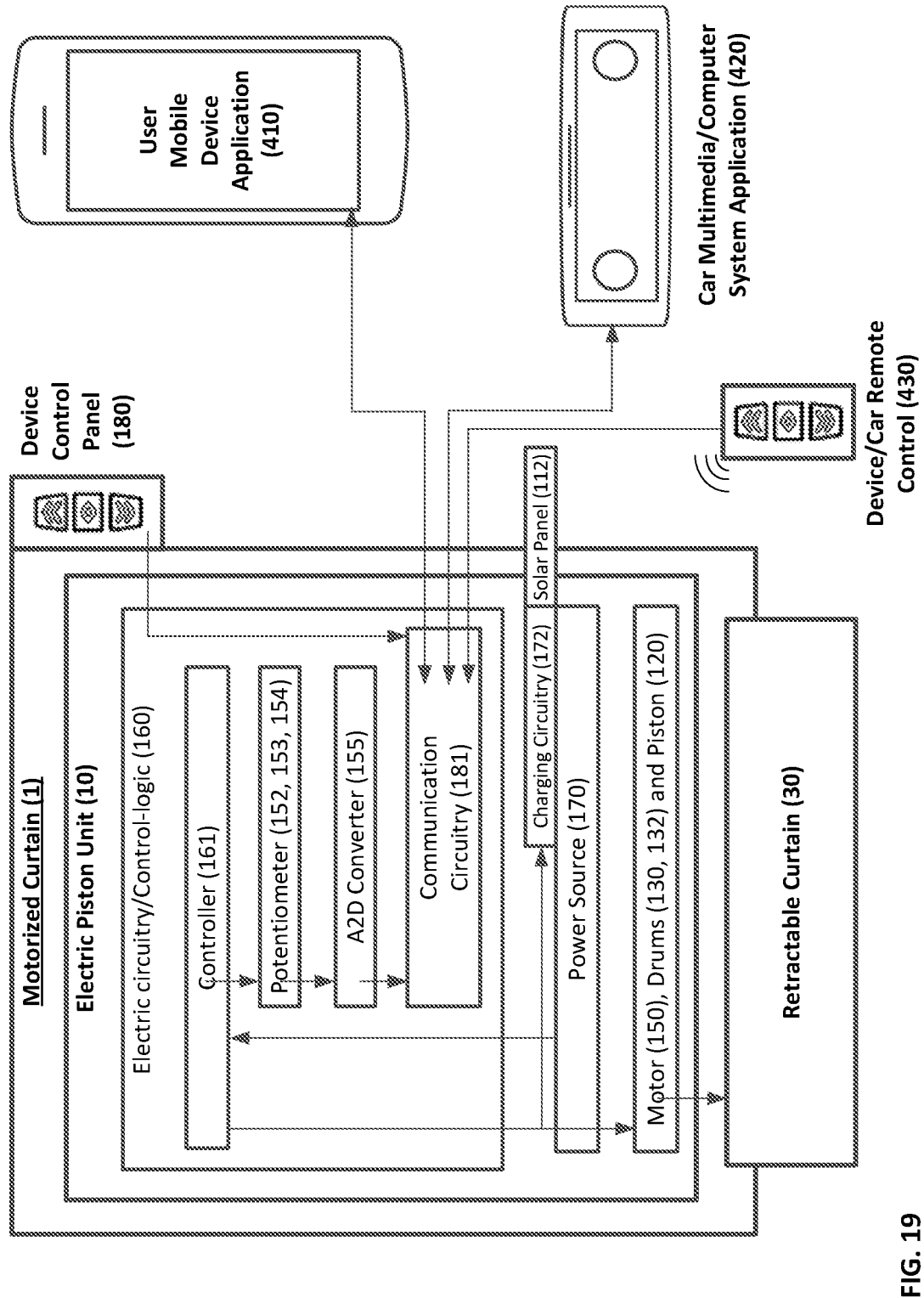
In FIG. 19 there is shown a schematic layout of an exemplary motorized car curtain/shade system, in accordance with some embodiments; and In FIG. 20 there is shown a schematic user mobile/computer application interface screen of an exemplary motorized car curtain/shade system, in accordance with some embodiments.

In FIG. 19 there is shown a schematic layout of an exemplary motorized car curtain/shade system, in accordance with some embodiments. In the figure, a user mobile device application (410), a car multimedia/computer (420), a device/car remote control (430), and a device control panel (180), are shown to be communicatively connected to a motorized curtain (1) device including an electric piston unit (10) and a retractable curtain (30).

The electric piston unit (10) includes an electric-circuitry/control-logic (160), a power source (170) such as a rechargeable battery, and the unit's motor (150), drums (130, 132) and pistons (120). User operation commands are communicated from the user device (410), the user system (420), the control panel (180) and/or the remote control (430)—through the shown communication circuitry (181) of the electric circuitry (160) and on to the shown controller (161). The controller (161) adjusts power supply (e.g. connects, disconnects, changes polarity) from the battery (170) to the motor (150), based on the received operation commands, thereby controlling the extraction and retraction of the piston (120) and the corresponding opening and closing of the retractable car curtain/shade.

Resistance level electric outputs from the shown potentiometer (152, 153, 154), functionally connected to the motor (150) as described herein, are converted to a digital data representation by the analog to digital (A2D) converter (155) and communicated by the communication circuitry (181) to the user mobile/computer application (410) for generating and presenting the application user with an indication of the extent to which the piston (120) is extracted and the curtain is open/spread-out over the car window, wherein the level of indicated piston/curtain extraction is based on one or more received potentiometer resistance values.

Figure 20:
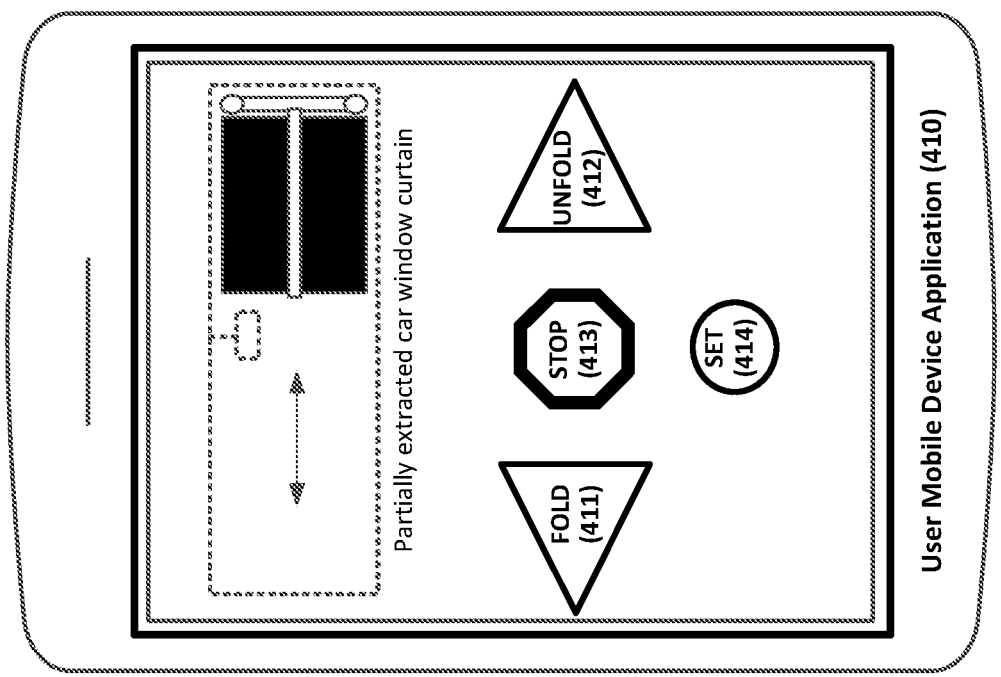

In FIG. 20 there is shown a schematic user mobile/computer application interface screen of an exemplary motorized car curtain/shade system, in accordance with some embodiments. On the interface screen curtain 'fold' (411), 'unfold' (412) and 'stop' (folding/unfolding) (413) buttons are shown. Further shown is a 'set' (414) button for communicating to the piston unit that the current specific piston/curtain opening level/status—for example, when the curtain is not yet fully extracted but already covers the entire area of the user's car window—is to be registered by the unit. A later long hold of the application 'unfold' (412) button will cause the piston unit to gradually extract the piston/curtain (from a folded position) and to automatically stop when the user set and registered piston/curtain opening level/status is reached.

On the top section of the interface screen there is shown a drawing/animation for graphically presenting to the user the extent to which the curtain is currently open/closed over the car's window (415). In the figure, the car window curtain, in black, is shown to be partially extracted.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

The invention claimed is:
1. A motorized curtain comprising:
a curtain including:
a sheet;
a first curtain pole connected to a first edge of said sheet; and a second curtain pole connected to a second, opposite, edge of said sheet;
and
an electric spiraling piston unit including:
a drum around which a piston is spiraled when in a retracted orientation, said drum positioned within a piston housing;
an electric motor having a drive shaft connected to a central axis of said drum such that motor torque is relayed to the axis causing said drum to spin, wherein, when said drum is spun by said motor in a first direction said piston un-spirals and extracts out of said piston housing in a straight orientation and when spun by said motor in a second direction said piston spirals around said drum and retracts into said piston housing;
a first curtain connector for retaining said piston housing to said first curtain pole; and a second curtain connector for retaining a tip of said piston to said second curtain pole, such that upon extraction of said piston by said motor, said first curtain pole remains stationary and connected to said piston housing and said second curtain pole travels, along with and with support of said piston tip, away from said piston housing—to spread said sheet thereby closing said curtain.

2. The motorized curtain according to claim 1, wherein said piston housing further includes one or more window attachment components for attaching said piston housing to a surface of a window.

3. The motorized curtain according to claim 2, wherein said attachment components are selected from the group consisting of: a vacuum based mechanism, an adhesive based mechanism, a magnet based mechanism, a screw based mechanism and a pin based mechanism.

4. The motorized curtain according to claim 2, wherein said electric spiraling piston further includes:
a rechargeable battery for powering said electric motor; and
one or more solar panels positioned on an outer bottom surface of said piston housing, for charging said rechargeable battery, such that upon attaching said piston housing to the surface of a window by said window attachment components, said solar panels face the window.

5. The motorized curtain according to claim 2, wherein said electric spiraling piston further includes a camera positioned on an outer surface of said piston housing, such that upon attaching said piston housing to the surface of a window by said window attachment components, said camera faces the window.

6. A motorized curtain system comprising:
a curtain including:
a sheet;
a first curtain pole connected to a first edge of said sheet; and
a second curtain pole connected to a second, opposite, edge of said sheet;
and
an electric spiraling piston unit including:
a drum around which a piston is spiraled when in a retracted orientation, said drum positioned within a piston housing;
an electric motor having a drive shaft connected to a central axis of said drum such that motor torque is relayed to the axis causing said drum to spin, wherein, when said drum is spun by said motor in a first direction said piston un-spirals and extracts out of said piston housing in a straight orientation and when spun by said motor in a second direction said piston spirals around said drum and retracts into said piston housing;
a first curtain connector for retaining said piston housing to said first curtain pole; a second curtain connector for retaining a tip of said piston to said second curtain pole, such that upon extraction of said piston by said motor, said first curtain pole remains stationary and connected to said piston housing and said second curtain pole travels, along with and with support of said piston tip, away from said piston housing—to spread said sheet to thereby closing said curtain;
a potentiometer functionally associated with said drum for measuring specific electric resistance levels based on said drum's rotational orientation; and
communication circuitry for relaying data indicative of the measured electric resistance levels to a user communication device running a mobile device application; and
said mobile device application for:
calculating, based on a given measured electric resistance level, the length of a segment of said piston that is extracted out of said piston housing; and
visually presenting, over a screen of the user communication device, the length of the segment of said piston that is extracted out of said piston housing, relative to a predefined length of a segment representing a full extraction of said piston.

7. The motorized curtain system according to claim 6, wherein said mobile device application is further adapted to:
visually present, over the screen of the user communication device, a curtain operation user interface;
receive one or more piston extraction or retraction user commands through said curtain operation user interface and relay them to said electric spiraling piston unit;
receive a full extraction user indication through said curtain operation user interface; and
associate a given specific electric resistance level value, received at substantially the same time as the time when the full extraction user indication was received, with a full extraction of said piston.

* * * * *